US011225017B2

(12) United States Patent
Nishio et al.

(10) Patent No.: US 11,225,017 B2
(45) Date of Patent: Jan. 18, 2022

(54) THREE-DIMENSIONAL OBJECT SHAPING APPARATUS AND METHOD

(71) Applicant: Ricoh Company, Ltd., Tokyo (JP)

(72) Inventors: Takuei Nishio, Kanagawa (JP); Asato Tamura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 209 days.

(21) Appl. No.: 16/515,497

(22) Filed: Jul. 18, 2019

(65) Prior Publication Data

US 2020/0031052 A1  Jan. 30, 2020

(30) Foreign Application Priority Data

Jul. 24, 2018 (JP) .............................. JP2018-138631
Dec. 19, 2018 (JP) .............................. JP2018-237473

(51) Int. Cl.
*B29C 64/241* (2017.01)
*B29C 64/135* (2017.01)
*B29C 64/277* (2017.01)
*B29C 64/255* (2017.01)
*B29C 64/232* (2017.01)
*B29C 64/245* (2017.01)
(Continued)

(52) U.S. Cl.
CPC .......... *B29C 64/241* (2017.08); *B29C 64/135* (2017.08); *B29C 64/232* (2017.08); *B29C 64/245* (2017.08); *B29C 64/255* (2017.08); *B29C 64/277* (2017.08); *B33Y 10/00* (2014.12); *B33Y 30/00* (2014.12)

(58) Field of Classification Search
CPC .................................................. B29C 64/241
See application file for complete search history.

(56) References Cited

U.S. PATENT DOCUMENTS 5,158,858 A * 10/1992 Lawton .................. B33Y 30/00
264/401
5,545,367 A * 8/1996 Bae ........................ B33Y 50/02
264/401
(Continued)

FOREIGN PATENT DOCUMENTS

JP    H10-180881    7/1998
JP     4790264     10/2011
(Continued)

*Primary Examiner* — Atul P. Khare
(74) *Attorney, Agent, or Firm* — Xsensus LLP

(57) ABSTRACT

Disclosed is a three-dimensional object shaping apparatus for forming an object with a desired shape in a three-dimensional space represented by a three-dimensional orthogonal coordinate system of XYZ. The three-dimensional object shaping apparatus includes a light source; a drive mechanism to move the shaping surface parallel to an XY plane in a Z axis direction; an optical scanning unit to scan light emitted from the light source along a Y axis direction perpendicular to the Z axis; and a rotation mechanism to rotate one of the optical scanning unit and the shaping surface relative to each other with respect to the Z axis as a rotation axis, where a pattern of the light to be applied to the shaping surface is controlled by a combination of a rotation of the shaping surface performed by the rotation mechanism and the scanning of the light performed by the optical scanning unit.

14 Claims, 20 Drawing Sheets

(51) Int. Cl.
*B33Y 30/00* (2015.01)
*B33Y 10/00* (2015.01)

(56) References Cited

U.S. PATENT DOCUMENTS

| | | | | |
|---|---|---|---|---|
| 8,142,179 | B2* | 3/2012 | Kihara | B33Y 30/00 |
| | | | | 425/375 |
| 8,172,562 | B2 | 5/2012 | Mattes | |
| 8,877,115 | B2* | 11/2014 | Elsey | B29C 64/393 |
| | | | | 264/401 |
| 9,120,270 | B2* | 9/2015 | Chen | B33Y 10/00 |
| 9,862,150 | B2* | 1/2018 | Chen | B33Y 30/00 |
| 10,150,280 | B2* | 12/2018 | Aghababaie | B29C 64/20 |
| 10,214,002 | B2* | 2/2019 | Pang | B33Y 10/00 |
| 10,474,135 | B2* | 11/2019 | Lin | B29C 64/124 |
| 10,647,055 | B2* | 5/2020 | Wynne | B29C 64/393 |
| 10,821,668 | B2* | 11/2020 | Thompson | B29C 64/129 |
| 10,821,669 | B2* | 11/2020 | Thompson | B29C 64/255 |
| 10,987,859 | B2* | 4/2021 | Medalsy | B29C 64/264 |
| 2016/0129631 | A1* | 5/2016 | Chen | B29C 64/245 |
| | | | | 425/150 |
| 2019/0210287 | A1* | 7/2019 | Newell | B29C 64/227 |

FOREIGN PATENT DOCUMENTS

| | | |
|---|---|---|
| JP | 5570330 | 8/2014 |
| JP | 2016-117273 | 6/2016 |
| WO | 2016/180842 | 11/2016 |

* cited by examiner

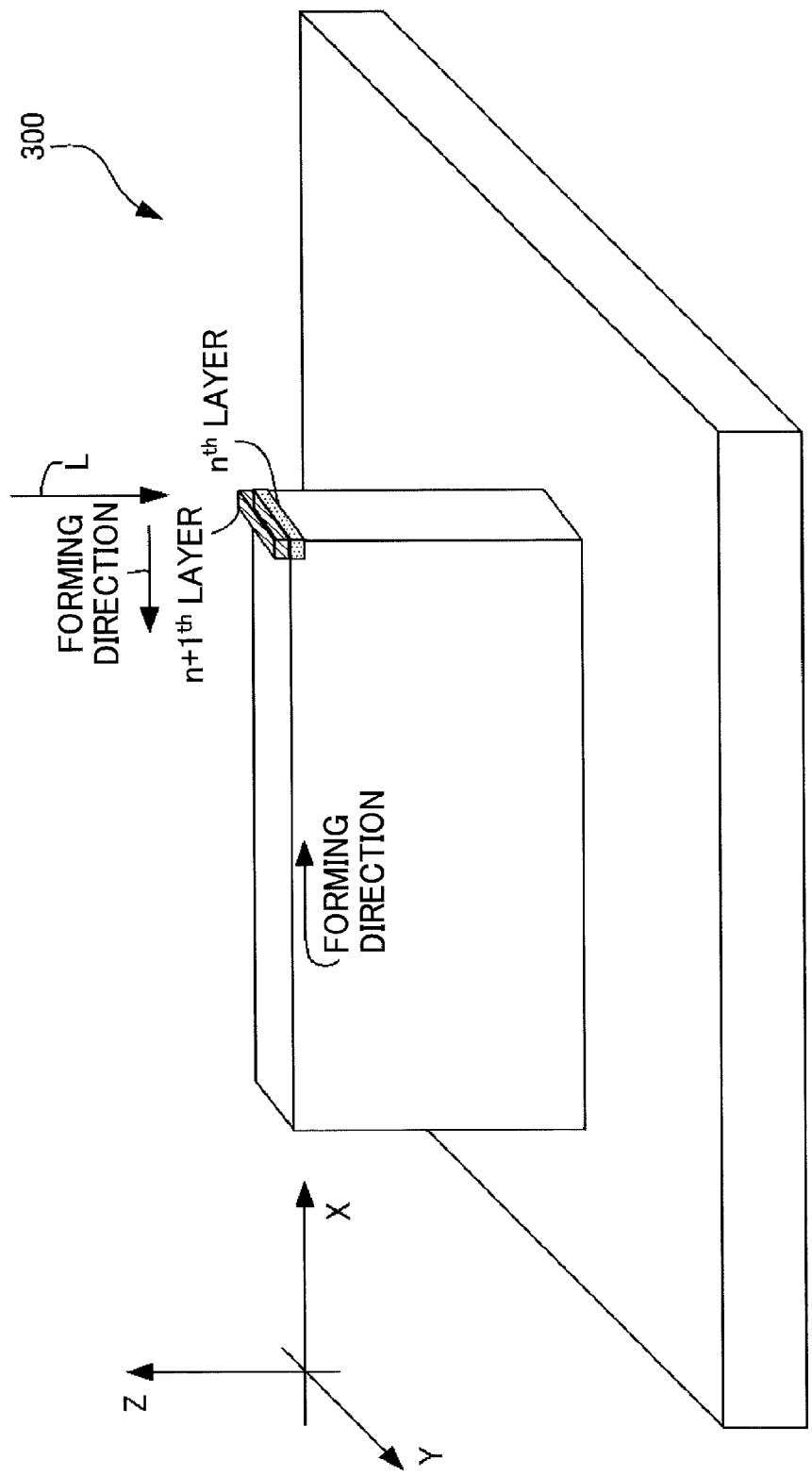

THREE-DIMENSIONAL OBJECT SHAPING APPARATUS AND METHOD

CROSS-REFERENCE TO RELATED APPLICATIONS

The present application is based on and claims priority to Japanese Patent Application No. 2018-138631, filed on Jul. 24, 2018, and Japanese Patent Application No. 2018-237473, filed on Dec. 19, 2018, the contents of which are incorporated herein by reference in their entirety.

BACKGROUND OF THE INVENTION

1. Field of the Invention

The disclosures discussed herein relate to a three-dimensional object shaping apparatus and a method for shaping a three-dimensional object.

2. Description of the Related Art

Three-dimensional object shaping methods (e.g., selective laser sintering and stereolithography) are known to cure a material (such as a thermoplastic resin, a metal, a photo-curable resin, etc.) by irradiation with light to deposit the cured material on a layer-by-layer basis to gradually form a three-dimensional object. Such three-dimensional object shaping methods typically employ the additive manufacturing technology. The additive manufacturing technology includes generating shape data of multiple layers from a shape of an object, and depositing multiple layers based on the generated shape data. In such a related art of additive manufacturing technology, since a three-dimensional shaping is performed by depositing layers based on two-dimensional shape data, the shaping process requires a procedure of initially performing two-dimensional laser scanning on a shaping surface, and subsequently moving the shaping surface together with a stage so as to form a next layer.

Since the two-dimensional laser scanning method typically uses galvano scanning or the like, which requires repeatedly accelerating or decelerating mirror surfaces, there is potential for improvement in terms of scanning speeds.

RELATED-ART DOCUMENTS

Patent Documents

[Patent Document 1] Japanese Patent No. 4790264
[Patent Document 2] Japanese Patent No. 5570330

SUMMARY OF THE INVENTION

The present invention is made in light of the above-described point, and is intended to provide a technology to achieve both high accuracy and high speed shaping of three-dimensional objects.

According to an aspect of an embodiment, a three-dimensional object shaping apparatus is provided for forming an object with a desired shape by application of light onto a shaping surface or a material disposed on an already shaped layer in a three-dimensional space, the three-dimensional space being represented by a three-dimensional orthogonal coordinate system of XYZ. The three-dimensional object shaping apparatus includes a light source configured to emit light;

a drive mechanism configured to move the shaping surface parallel to an XY plane in a Z axis direction;

an optical scanning unit configured to scan light emitted from the light source along a Y axis direction perpendicular to the Z axis; and a rotation mechanism configured to rotate at least one of the optical scanning unit and the shaping surface relative to each other with respect to the Z axis as a rotation axis, wherein a pattern of the light to be applied to the shaping surface is controlled by a combination of a rotation of the shaping surface performed by the rotation mechanism and the scanning of the light performed by the optical scanning unit.

Other objects, features and advantages of the present invention will become more apparent from the following detailed description when read in conjunction with the accompanying drawings.

BRIEF DESCRIPTION OF THE DRAWINGS

FIGS. 8A and 8B are diagrams each illustrating an example of operations in a related art shaping apparatus;

DETAILED DESCRIPTION OF THE
PREFERRED EMBODIMENTS

The following illustrates preferred embodiments with reference the accompanying drawings.

Figure 1:
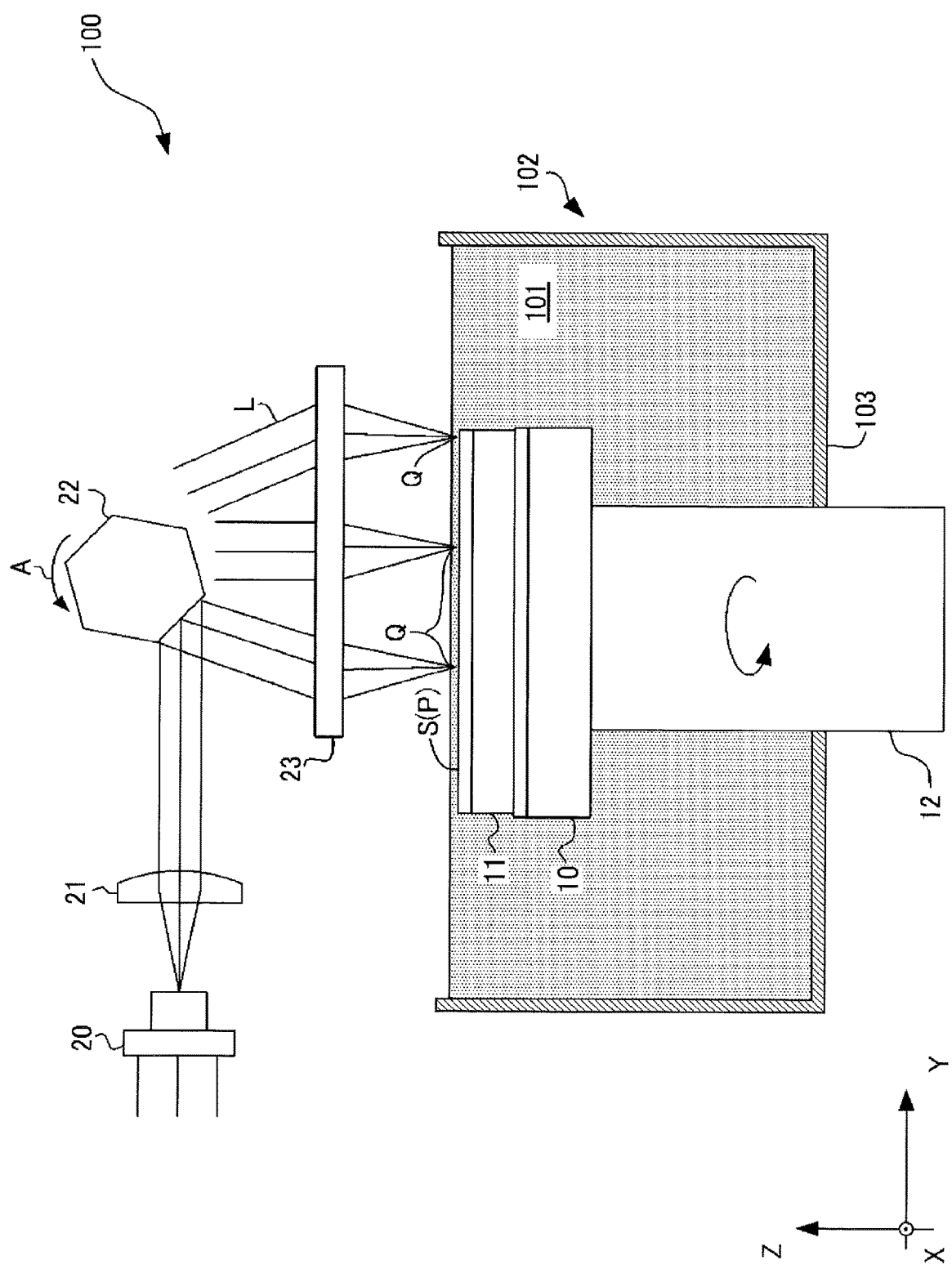
FIG. 1 is a diagram illustrating an example of a three-dimensional shaping apparatus according to an embodiment of the present invention.

FIG. 1 illustrates a shaping apparatus 100, according to a first embodiment of the present invention for shaping a three-dimensional object in a three-dimensional space represented by a three-dimensional orthogonal coordinate system of XYZ. Note that a three-dimensional orthogonal coordinate system of XYZ is used in the following description, where a rotation axis of a rotation stage 10 described later is defined as a Z axis, an axis parallel to a rotation axis of a rotation mirror 22 is defined as an X axis, and a direction perpendicular to the Z axis and the X axis is defined as a Y axis.

The shaping apparatus 100 of the present invention is a three-dimensional object shaping apparatus. The shaping apparatus 100 includes an optical emitter 20 as a light source, and is configured to form an object with a desired shape by irradiating a material 101 disposed on a shaping surface S with light L emitted from the optical emitter 20. The shaping apparatus 100 includes a collimator lens 21 configured to convert light emitted from the optical emitter 20 into parallel light, a rotation mirror 22 that is a polygonal mirror configured to rotate around a central axis parallel to an X direction, and a scanning lens 23 that is a condensing optical system. The shaping apparatus 100 includes a shaping stage 11 having a surface facing a +Z direction (hereinafter referred to as "+Z direction facing surface"), where a material 101 is disposed to form a finally obtained object P, and a rotation stage 10 acting as a rotation mechanism disposed in a direction toward the −Z axis direction relative to the shaping stage 11 and configured to rotatably support the shaping surface S with respect to a Z axis as the center. The shaping apparatus 100 includes a Z stage 12 configured to support the rotation stage 10 with raising or lowering in the Z axis direction, or more specifically, configured to support the rotation stage 10 movably in ±Z directions, and a shaping tank 102 configured to hold the material 101 around the shaping stage 11. In this embodiment, the Z stage 12 is disposed to penetrate a bottom surface 103 of the shaping tank 102.

The optical emitter 20 may be made of a CW laser, a pulsed laser, or the like, and a short pulse emitting laser with pulse widths of several tens of ps or less is particularly suitable for multiphoton photopolymerization. The collimator lens 21 is a lens that converts light L emitted from the optical emitter 20 into light approximately parallel to an optical axis. The rotation mirror 22 is a rotating polygon mirror having a mirror plane formed on each of side surfaces of a polygonal column (especially a hexagonal column in FIG. 1), and is configured to rotate around an axis parallel to an X axis. The rotation mirror 22 reflects light L traveling along a Y direction to change the angle of the light L by rotating in a rotation direction as an "A" direction in FIG. 1. The scanning lens 23 is a so-called fθ lens, which converts light L moving at a constant angular velocity θ along the Y direction into a scanning light L having a constant velocity in the Y direction. As described above, a light source of the scanning light L is formed by the optical emitter 20, the collimator lens 21, the rotation mirror 22, and the scanning lens 23 as one unit. In this case, it is desirable that a distance scanned by the rotation mirror 22 and the scanning lens 23 be longer than a radius of the shaping stage 11. Such a distance scanned by the rotation mirror 22 and the scanning lens 23 will sufficiently secure the size of the shaped object P.

In this embodiment, the rotation mirror 22 and the scanning lens 23 are used for scanning beams. However, the configuration is not limited to such an example, and the scanning lens 23 may be a condensing optical system or a reflecting optical system that includes a plurality of lenses addition, the rotation mirror 22 may be an element or a unit for forming one-dimensional scanning light; for example, a galvano mirror or a MEMS mirror may be used. However, the rotation mirror 22 is preferred because acceleration or deceleration of the mirror is required; additionally a reciprocating scanning may cause non-uniformity in a thermal distribution due to the sequence of optically scanning the object not being in a single direction.

The material 101 is, for example, ultraviolet curable liquid resin in the present embodiment, and while the material 101 at irradiation positions Q is irradiated with the scanning light L, the material 101 at irradiation positions Q is cured to gradually form an object P as a three-dimensional object. The material 101 may be any material in which the positions irradiated with the scanning light L form a three-dimensional shape, such as a thermoplastic resin, gel-like material, or the like.

Figure 2:
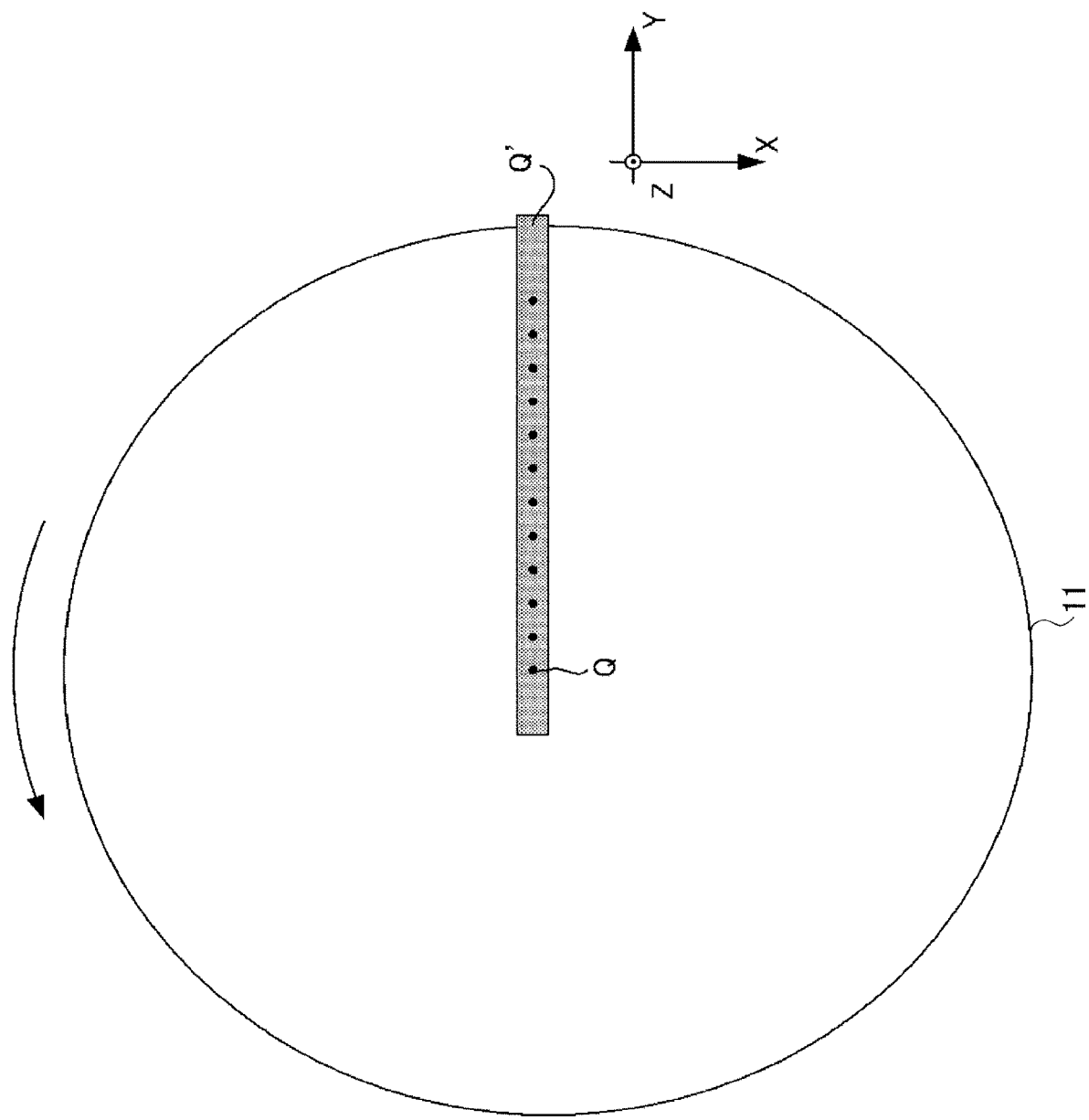
FIG. 2 is a diagram illustrating an example of scanning performed by an optical scanning unit according to an embodiment of the present invention.
Figure 3:
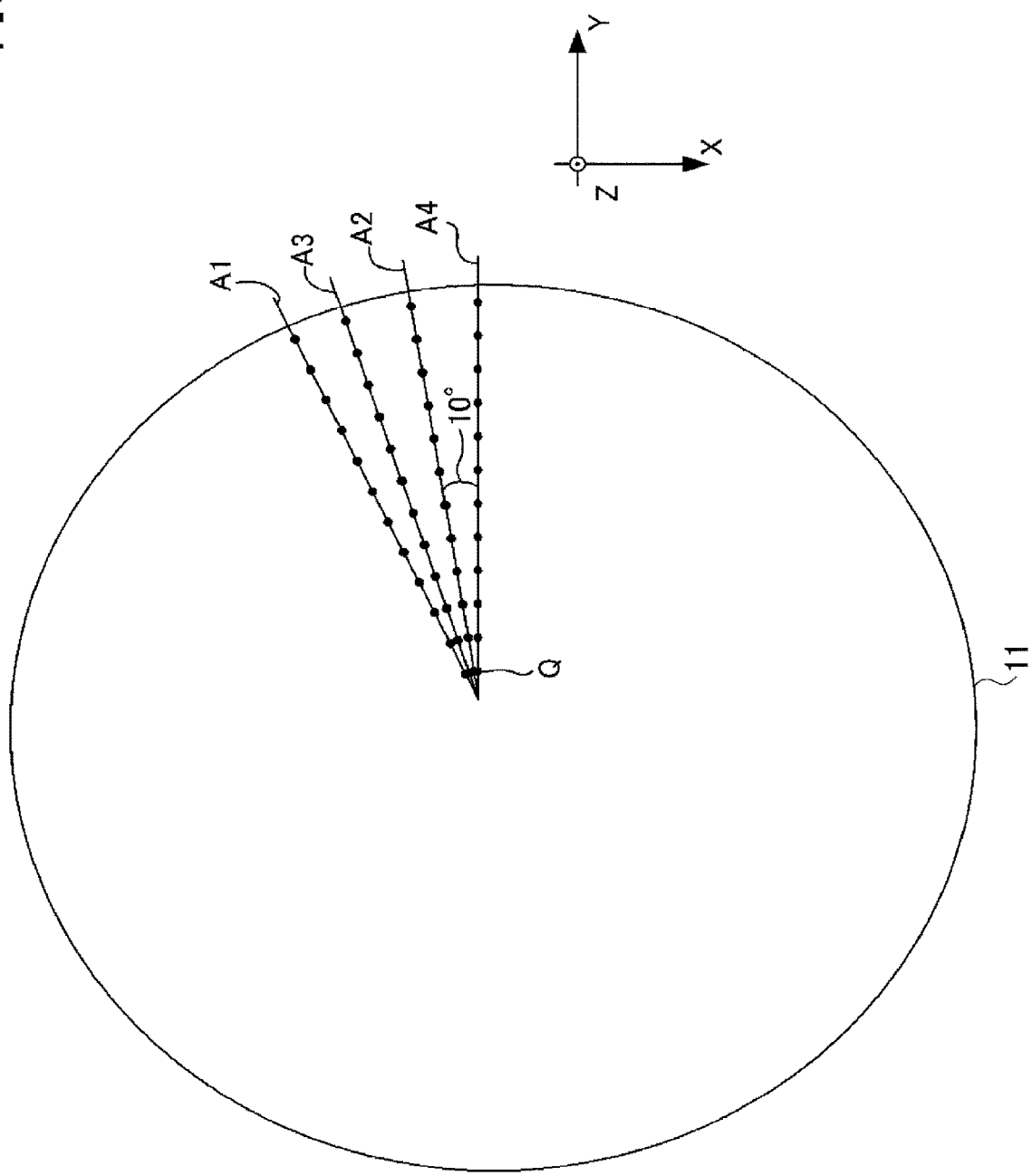
FIG. 3 is a diagram illustrating an example of transition of a path of irradiation light of a three-dimensional shaping apparatus illustrated in FIG. 1.

The rotation stage 10 is a cylindrical stage that rotates around a center of the Z axis, and the shaping stage 11 is disposed on the rotation stage 10 in the +Z direction. A material 101 is disposed on the shaping stage 11, and scanning light. L is adjusted so that irradiation positions Q are located on the +Z direction facing surface of the shaping stage 11, as illustrated in FIGS. 2 and 3. In such a configuration, shaping surface S is formed parallel to an XY plane on the shaping stage 11. In an initial stage, such a shaping surface S indicates a surface of the shaping stage 11, and in a process of forming a later-described object P, the shaping surface S indicates a +Z direction facing surface of a layer immediately preceding the currently formed layer of the shaped object P, as will be described later. A Z stage 12 is a cylindrical member, which is supported with raising or lowering in the axis direction. The Z stage 12 has an end in the direction to which a rotation stage 10 attached. It is desirable that the center of the Z stage 12 is aligned with the rotational center of the rotation stage 10.

As illustrated with a shaded pattern in FIG. 2 viewed from the +Z direction, any irradiation positions Q within an irradiation region Q', which is formed along the Y axis, are irradiated with scanning light L, in accordance with on/off of the optical emitter 20 and an angle of the rotation mirror 22. The scanning light L constantly scans toward the Y direction without depending on the rotation of the rotation stage 10. When the shaping surface S rotates together with the rotation stage 10, a plurality of trajectories of scanning light L illustrated in FIG. 3 are radially formed as a result of scanning of the shaping surface S along a radial direction. Note that each irradiation of the scanning light L along the radial direction is a "scanning step of scanning light along a Y direction on the shaping surface S".

The rotation stage 10 constantly rotates at a predetermined angular velocity during shaping, and one rotation corresponds to shaping of one layer. When the rotation stage 10 rotates once, the Z stage 12 descends in the −Z direction by the thickness of one layer of the shaped object P, that is, by 50 µm in this embodiment. Note that the ratio of one rotation of the rotation stags 10 to a moving speed of the Z stage 12 can be optionally changed. The stage 12 may be moved by the thickness of one layer when the rotation stage 10 is rotated once from an initial position, i.e., when shaping of one layer is completed. However, if the Z stage 12 moves in such a step-wise manner, unnecessary level differences may be formed in the shaped object P. Thus, it is desirable that the Z stage 12 constantly moves at a constant speed. The rotation of the rotation stage 10 is a "rotation step of rotating the shaping surface S with respect to a Z axis as a rotation axis". Note that the rotation step is not specified as the rotation of the rotation stage 10 alone. The rotation step may be applied to the rotation mirror 22, and may be applied to the rotation stage 10 and the rotation mirror 22 rotating in opposite directions. That is, the rotation step may be applied to any rotations in which the shaping surface S and the optical scanning unit are rotated relative to each other with respect to the Z axis as a rotation axis.

The number of scanning times of scanning light L during one rotation of the rotation stage 10 may be determined in accordance with a desired resolution of the shaped object P and the like; the number of scanning times of scanning light L during one rotation of the rotation stage 10 may be controlled by a desired value, which is determined in accordance with the rotation speed of the rotation mirror 22 and the rotation speed of the rotation stage 10. Note that main scanning in a typical copier may be determined to be movement of the scanning light L in one direction (the Y direction in this case) caused by the rotation of the rotation mirror 22, and sub scanning in the copier may be determined to be a change in the scanning position due to the rotation of the rotation stage 10, according to a conceptual image of a process of forming a shaped object P on the shaping surface S.

FIGS. 3 and 4A to 4D illustrate operations when forming a shaped object P using the shaping apparatus 100 with such a configuration. FIG. 3 is a diagram illustrating scan lines A1 to An simulating trajectories of scanning light L at irradiation positions Q when the rotation stage 10 is rotated by 10 degrees each in view of the rotation stage 10 from the top in the +Z direction. In FIG. 3, wide intervals are depicted between the irradiation positions Q to facilitate viewing of the irradiation positions Q of the scanning light L; however, in reality, actual intervals between the irradiation positions Q are substantially narrow even at an outer edge of the shaping surface S. In FIG. 3, wide intervals are also depicted between the scan lines A1 and An; however, in reality, actual intervals between the scan lines A1 and An will each be a scanning distance of approximately 1 mm or less, and the angle per sub-scanning will also be a more appropriate angle.

Figure 4A:
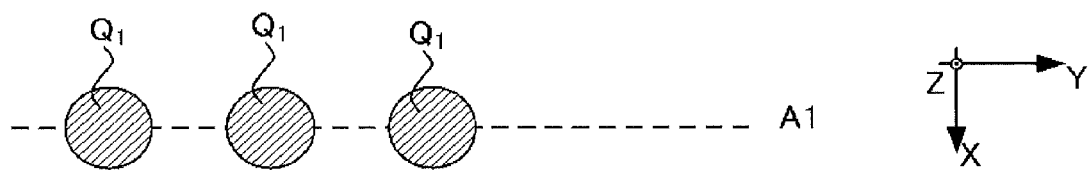
FIGS. 4A to 4D are diagrams each illustrating an example of a shaping operation performed by the three-dimensional shaping apparatus illustrated in FIG. 1.
Figure 4B:
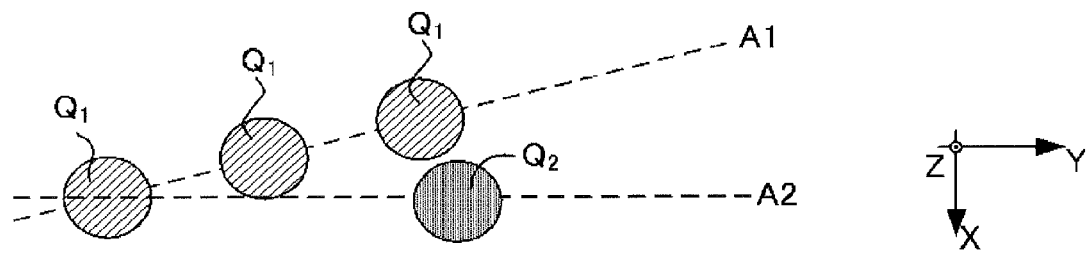
Figure 4C:
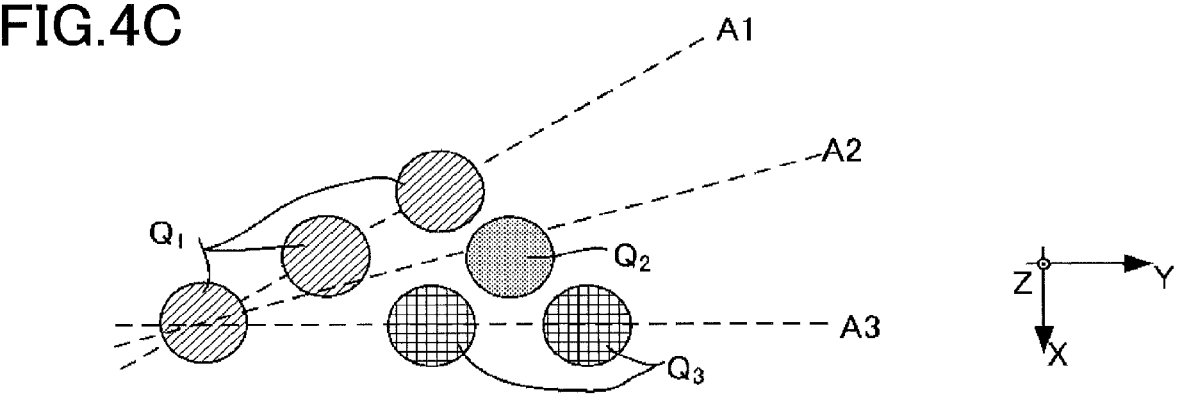
Figure 4D:
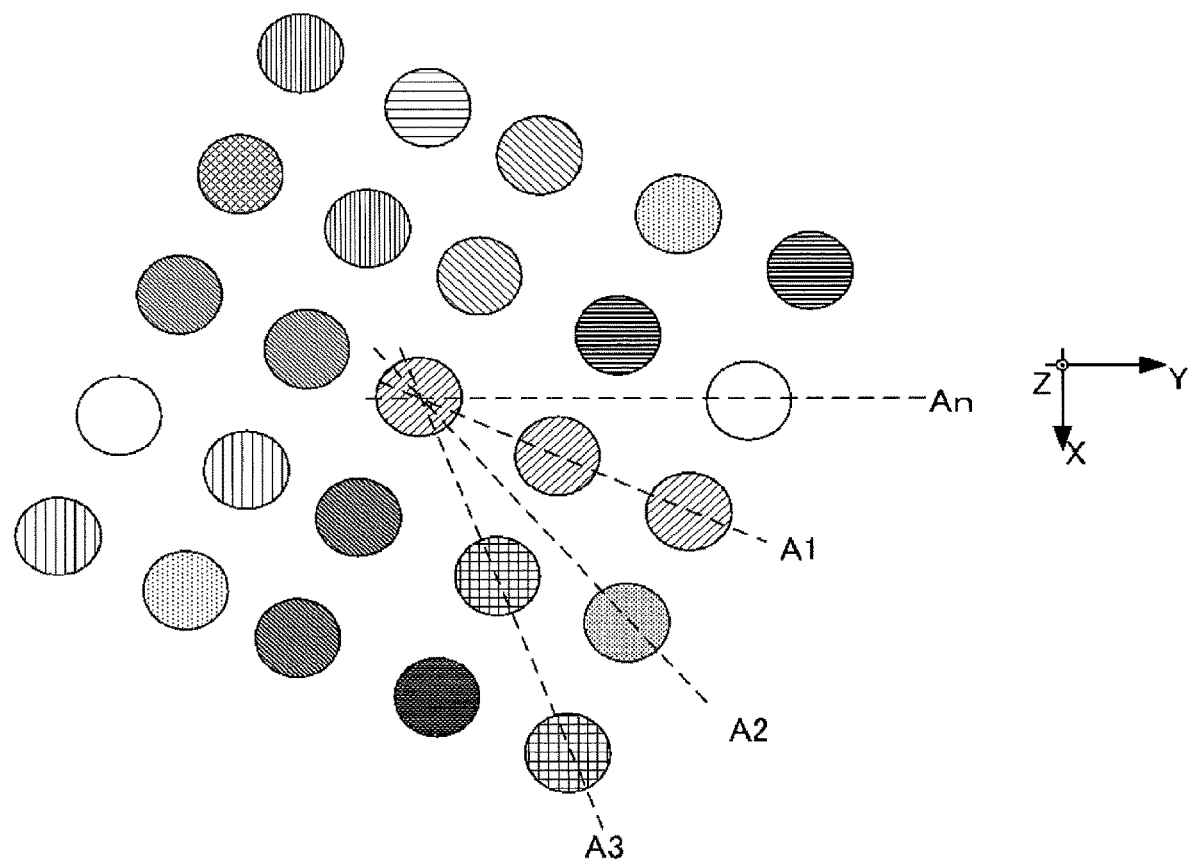

As illustrated in FIG. 4A, when the rotation stage 10 is at an initial position of 0 degrees, the scanning light L forms irradiation positions Q1 aligned along a scan line A1 in the Y direction (a scanning step). Next, when the rotation stage 10 rotates by 10 degrees, shaping positions (i.e., the irradiation positions Q1) formed by a first, scan are rotated by 10 degrees, as illustrated by a diagonal line in FIG. 4B (a rotation step). When the scanning light L scans in this state, irradiation positions Q2 aligned along a scan line A2 are formed, as illustrated in FIG. 4B. Likewise, when the rotation stage 10 further rotates by 10 degrees, irradiation positions Q3 are formed along a scan line A3, as illustrated in FIG. 4C. When this operation is repeated by 10 degrees each, trajectories of the irradiation positions Q are uniformly formed over the shaping surface S, as illustrated in FIG. 4D. By operating the shaping apparatus 100 in this manner, planar patterns of desired shapes may be formed over the entire shaping surface S. That is, a shaped object P with a desired shape may be obtained by only having shape data of multiple planar patterns that are three dimensionally linked at respective irradiation positions Q.

In such shaped patterns, uniform energy may be applied to the material 101 by controlling a typical light source irradiation density as uniformly as possible, thereby obtaining a good shaping result. Accordingly, in the present embodiment, irradiation time intervals are varied between irradiation positions far from the center of rotation and at irradiation positions close to the center of rotation such that the irradiation density per area is controlled to be uniform. Alternatively, the irradiation density per area may be controlled by adjusting lighting intervals of the optical emitter 20.

In FIGS. 4A to 4D, wide intervals are provided between the irradiation positions Q; however, in practice, it is more desirable to scan each of the irradiation positions Q multiple times in an overlapping manner in order to perform continuous shaping. In FIG. 4D, five irradiation positions Q per side are illustrated. However, the number of such scanning times to form irradiation positions Q is not limited to five, and any number of scanning times may be performed to form irradiation positions Q.

As already described above, a rotation of the rotation stage 10 corresponds to 50 µm, which is a thickness of one layer obtained by one rotation, in the present embodiment. Thus, when the rotation stage 10 rotates 360 degrees, the Z stage 12 descends toward the −Z direction by one layer, i.e., 50 µm (driving step). By such descent, the material 101, which is filled in the shaping tank 102, spreads over the shaping surface S, thereby supplying the material 101 to the shaping surface S.

Figure 5:
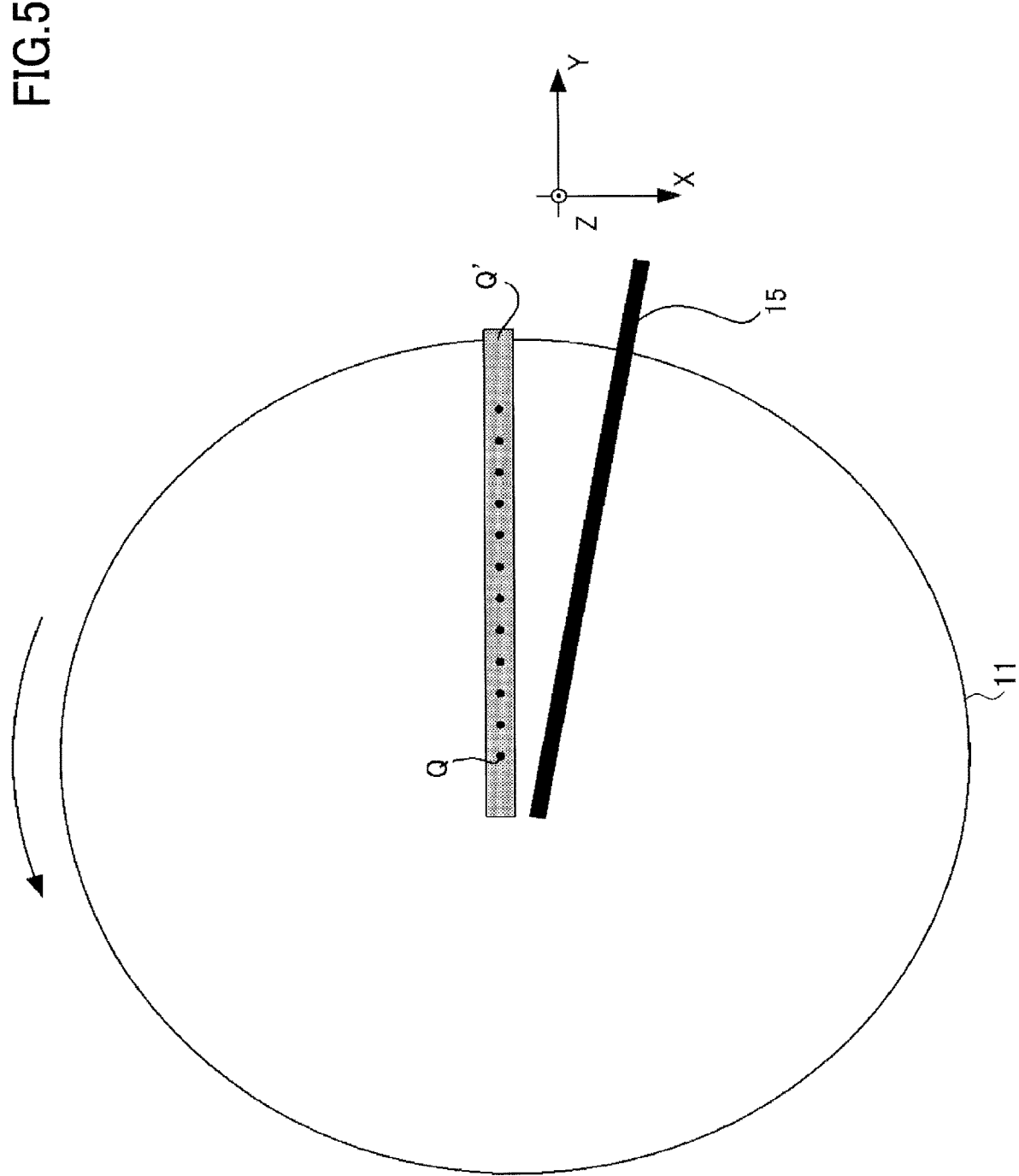
FIG. 5 is a diagram illustrating an example of a configuration of a surface height adjusting unit in the three-dimensional shaping apparatus illustrated in FIG. 1.
Figure 6:
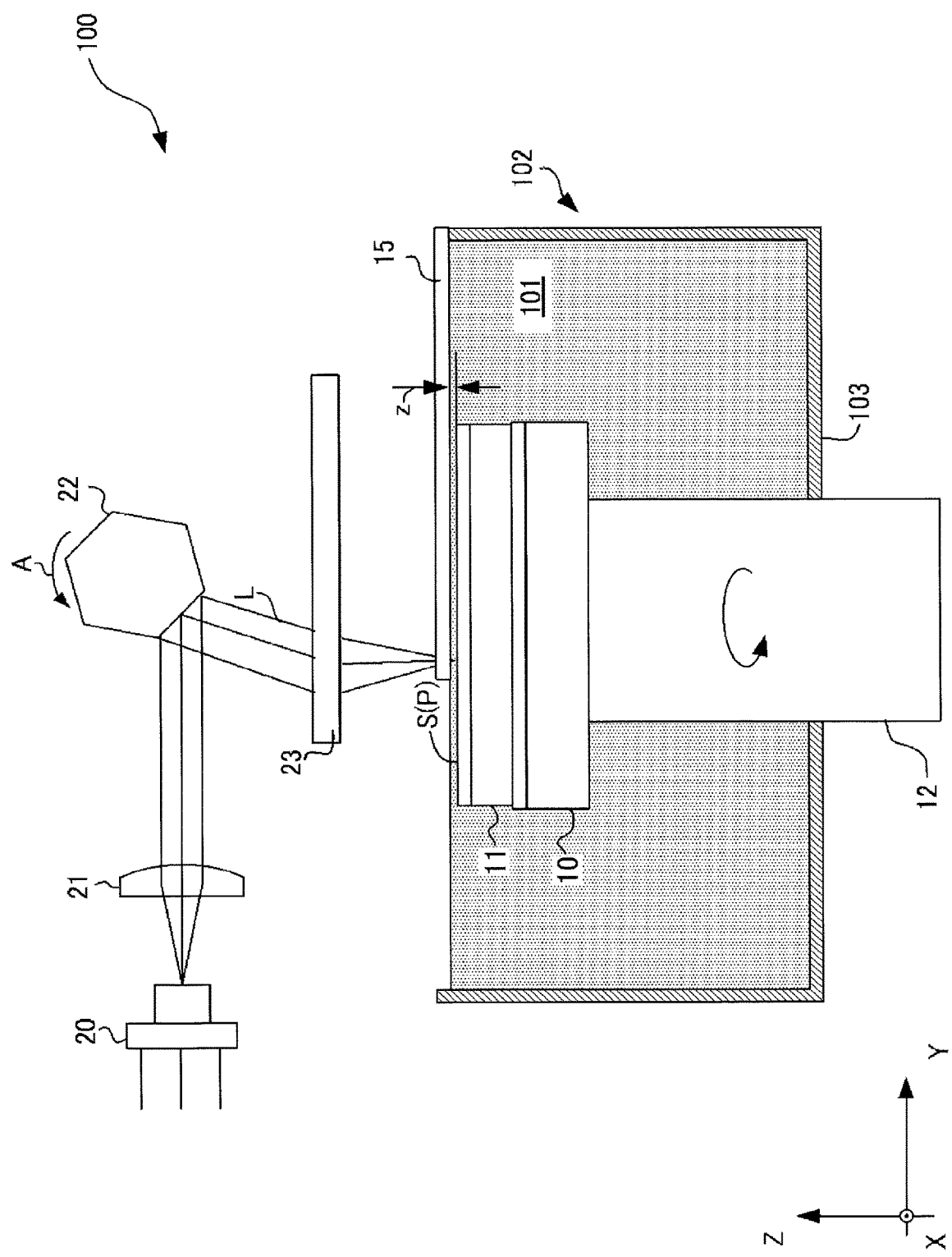
FIG. 6 is a diagram illustrating the three-dimensional shaping apparatus in FIG. 5, which is viewed from a different angle.

Note that the configuration of the supply of the material 101 is not limited to the above-described configuration of spontaneously spreading of the material 101 by the descent of the Z stage 12; the configuration of the supply of the material 101 may be implemented by a surface height adjusting unit 15 for maintaining a surface of the material 101 at a constant height, as illustrated, for example, in FIGS. 5 and 6. Such a surface height adjusting unit 15 is a column-like member located at a predetermined distance z away from the shaping surface S to level the material 101. It is desirable that the surface height adjusting unit 15 is provided upstream of the stage rotation direction with respect to the scanning positions of the scanning light L. It is also desirable that the surface height adjusting unit 15 is located sufficiently close to the scanning positions of the scanning light L within a range that does not interfere with the scanning light L. With such a configuration fine irregularities of the shaping surface S are spontaneously evened in accordance with the rotation of the rotation stage 10, which improves the surface accuracy of the material 101, and enables forming of the shaped object P more accurately.

Figure 7:
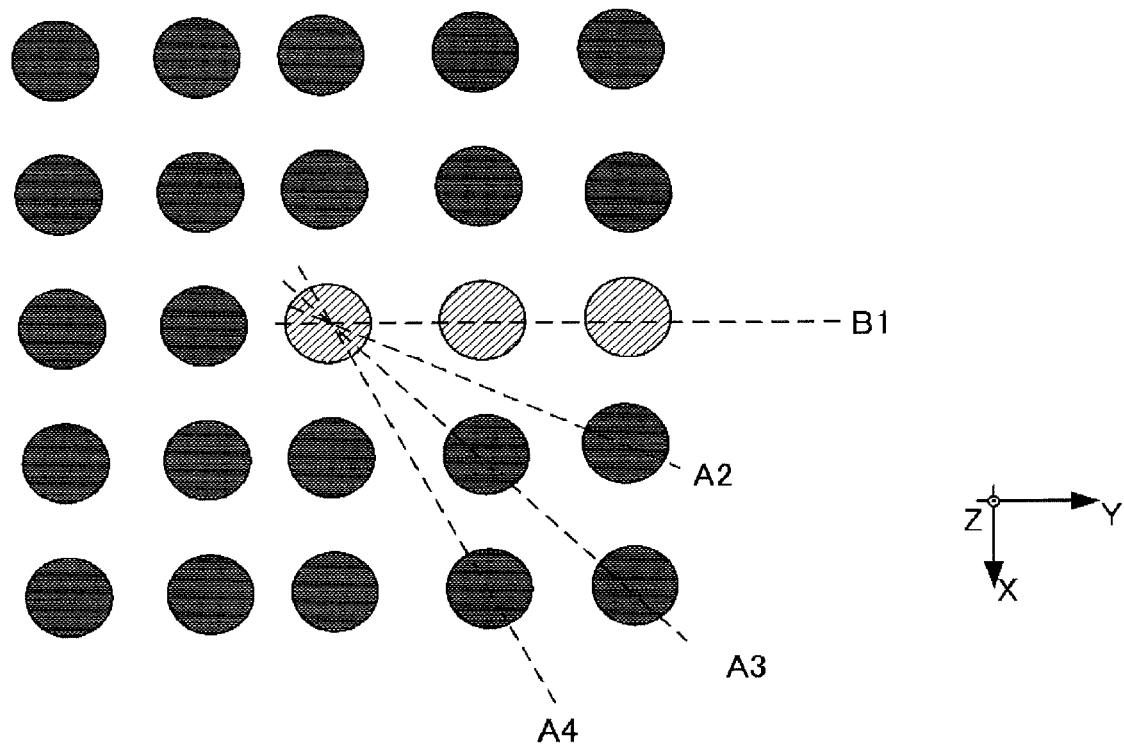
FIG. 7 is a diagram illustrating an example of an operation for shaping a second layer during the shaping operations illustrated in FIGS. 4A to 4D.

FIG. 7 is a simplified illustration of a shaped object P when shaping of the second layer is started after the first layer being shaped and the material 101 being supplied. In FIG. 7, the rotation of the rotation mirror 22 as an optical scanning unit is used as main scanning, and the rotation of the rotation stage 10 is used as sub-scanning. In this manner, continuous shaping may be performed for shaping of multiple layers without interruption of operation, which enables an increase in the shaping speed. Further, the scan line B1 illustrated in FIG. 7 corresponds to a position directly above the scan line A1 illustrated in FIG. 4A. Thus, shaping of the second layer starts from a most cooled portion of the first layer, which will not cause disproportion of a thermal distribution on the shaping surface S, and is thus preferable in terms of the shaping accuracy.

Figure 8A:
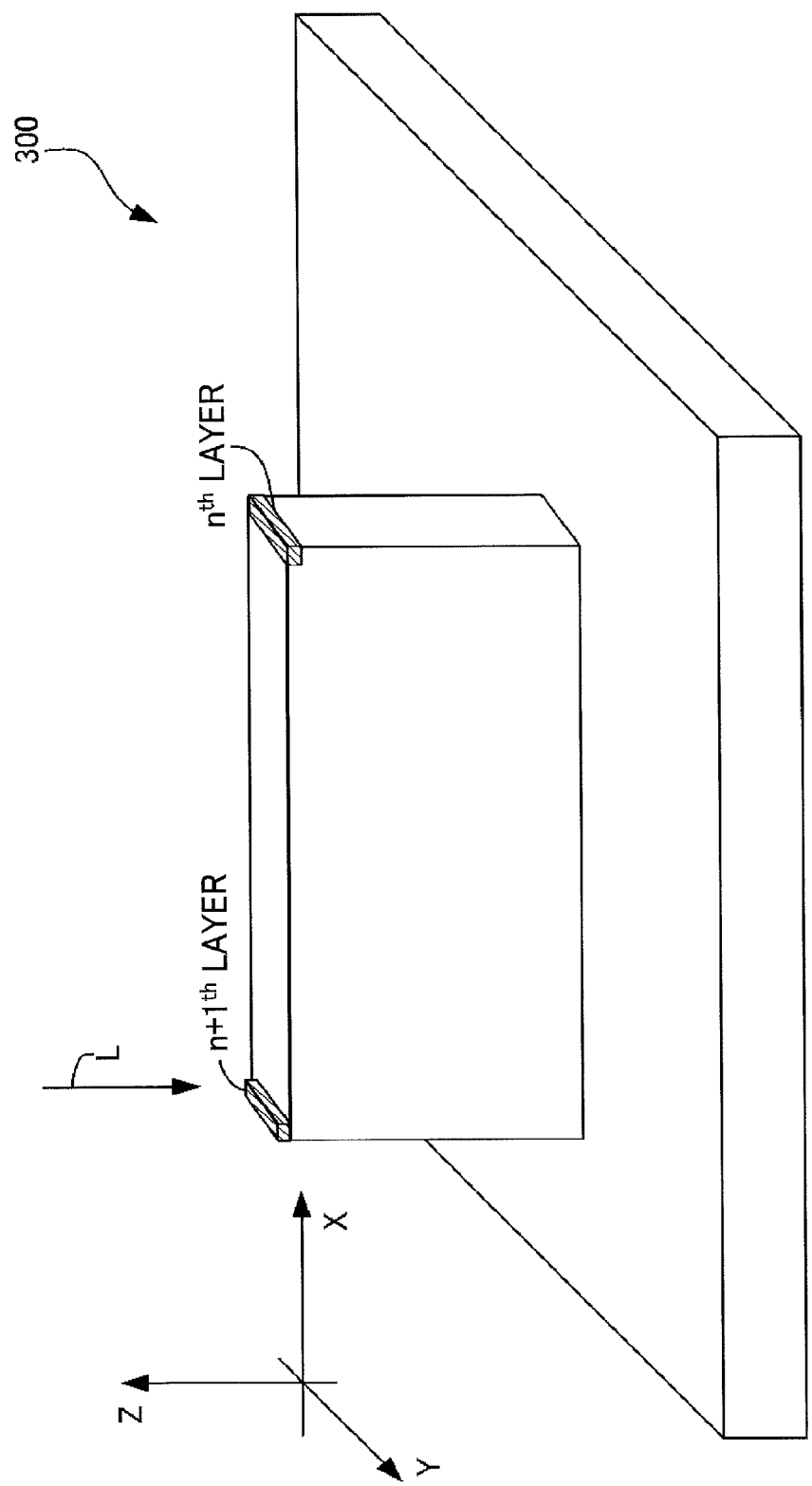

This point is described below in further detail. FIGS. 8A and 8B are diagrams each illustrating a 3D printer as an example of a related art shaping apparatus, where a Y direction is defined as a main scanning direction and an X direction is defined as a sub-scanning direction. As illustrated in such a 3D printer 300 in FIG. 8A, in order to start shaping of an n+1th layer after an nth layer has been shaped to a downstream end in the X direction, an initial position to start shaping of the n+1th layer needs to be returned to a most upstream end of the X direction. This unfortunately resulted in a decrease in the throughput. Hence, in order to improve the throughput, a reciprocating scanning may be considered as illustrated in FIG. 8B, where the n+1th layer is shaped from an end of a +X toward −X direction after the nth layer has been scanned to the downstream end in the X direction. However, if such a method illustrated in FIG. 8B is used, another problem arises; that is, shaping of a first portion of the n+1th layer starts before heat applied for shaping of a last portion of the nth layer has been cooled down.

Thus, according to the embodiment of the present invention, while the main scanning is performed by rotation of the rotation mirror 22, the shaping surface S is moved in a direction corresponding to the sub-scanning direction by rotation of the rotation stage 10 and moving of the Z axis of the Z stage 12. As a result, the throughput will be improved by not causing disproportion a thermal distribution and not causing interruption or acceleration/deceleration. Such a configuration enables both high accuracy and high speed in shaping of three-dimensional objects. In other words, the shaping apparatus 100 according to the present embodiment includes a Z stage 12 configured to move the shaping surface S in a Z axis direction; a rotation stage 10 configured to rotate at least one of an optical scanning module 25 and the shaping surface S relative to each other with respect to the Z axis as a rotation axis, and an optical scanning unit configured to scan scanning light L along a Y axis direction perpendicular to the Z axis, such that patterns of the scanning light L applied to the shaping surface S are controlled by a combination of a rotation of the shaping surface S performed by the rotation stage 10 and the scanning of scanning light L performed by the optical scanning unit. Such a configuration enables both high accuracy and high speed in shaping of three-dimensional objects.

Figure 9:
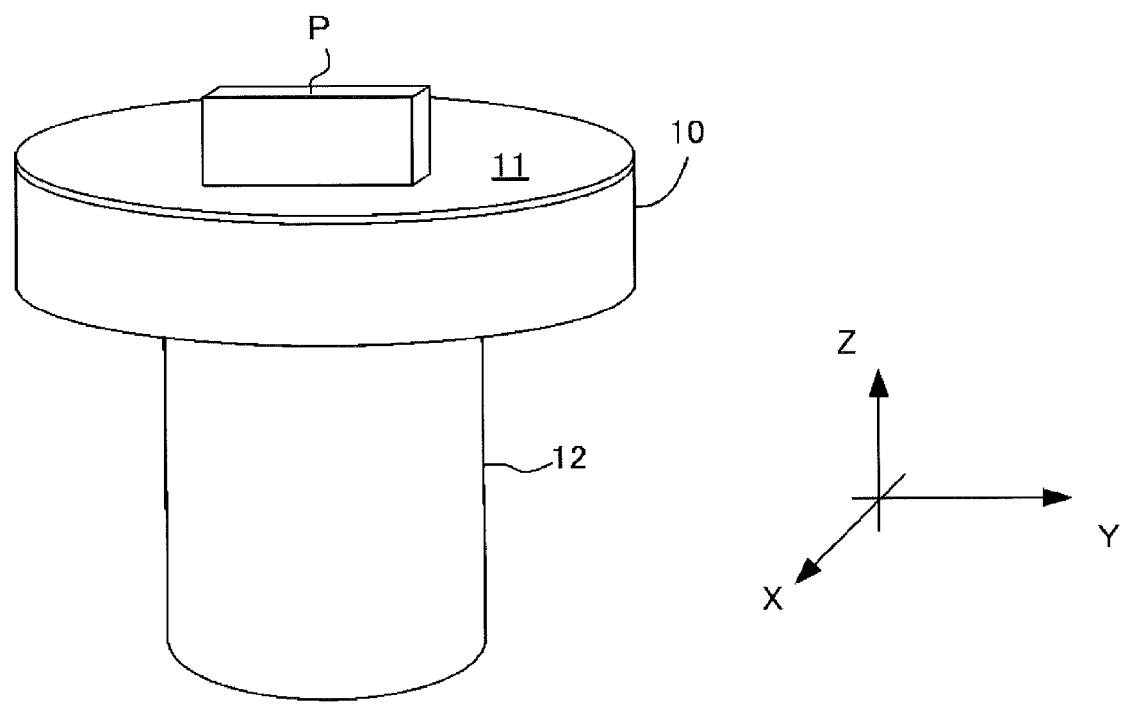
FIG. 9 is a diagram illustrating an example of a shaped object formed by the shaping operations illustrated in FIGS. 4A to 4D and 7.

The scan line B1 illustrated in FIG. 7 is scanned for shaping of the second layer in the same manner as scanning for shaping of the first layer illustrated in FIGS. 4A to 4D. The above-described process is repeated by a desired number of layers, so that a three-dimensional object (a shaped object P) is formed on the shaping stage 11 of the shaping apparatus 100 as illustrated in FIG. 9. In FIG. 9, only a rectangular parallelopiped shape formed with accumulated square shapes is illustrated as an example; however, any shape may be formed.

Figure 10:
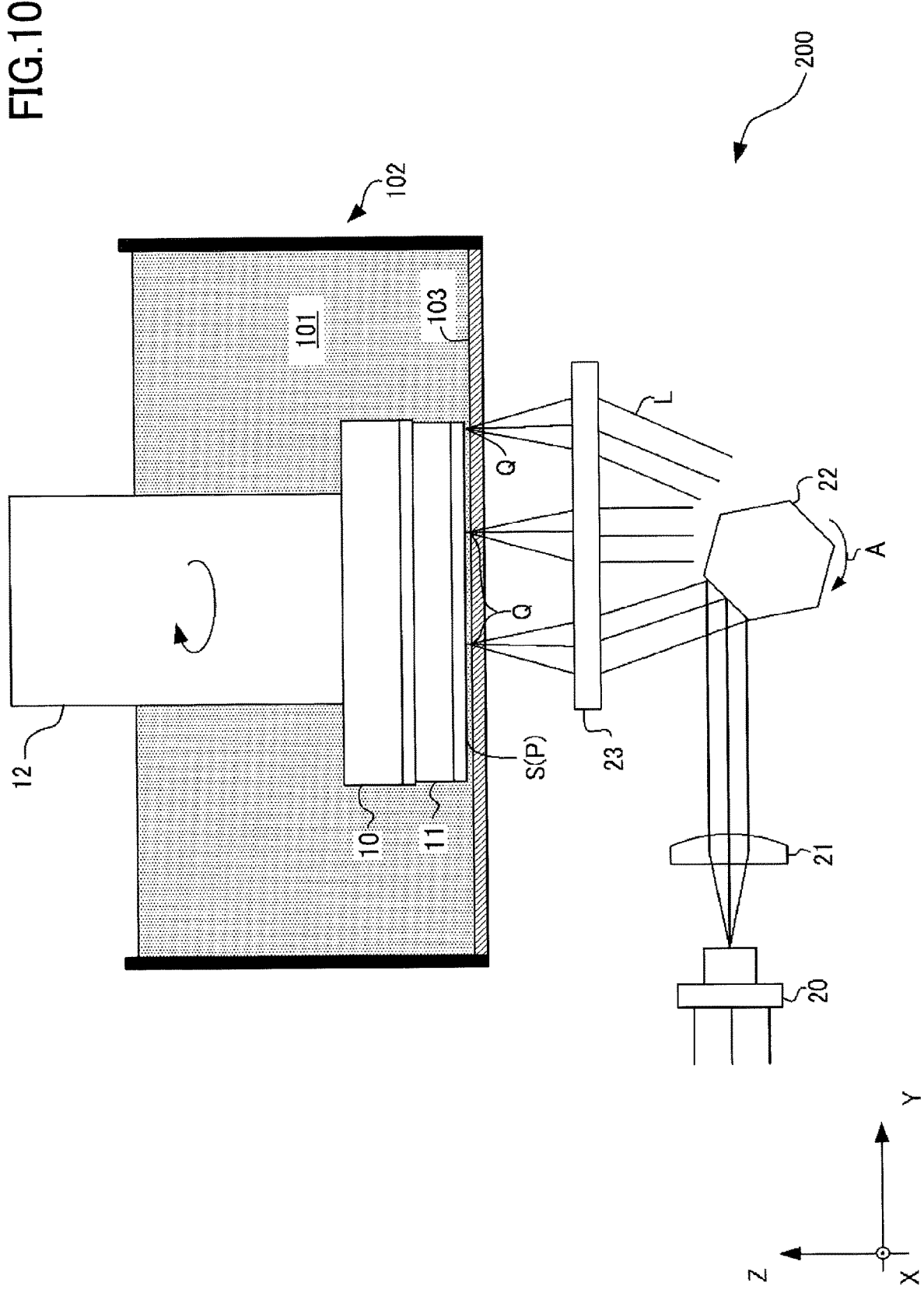
FIG. 10 is a diagram illustrating an example of a configuration of a three-dimensional shaping apparatus according to a second embodiment.

In the following, a second embodiment of the present invention will be described. A shaping apparatus 200 illustrated in FIG. 10 has a configuration in which, unlike the configuration illustrated in FIG. 1, the scanning light L is incident from a vertically lower side to a vertically upper side (in Z axis direction). In each of the following embodiments, the same elements as the first embodiment will be omitted with reference to the same reference numbers.

In the second embodiment, a shaping surface S is disposed on a −Z direction facing surface of the rotation stage 10 with the shaping surface S disposed thereon facing toward a −Z direction. Accordingly, it a gap is formed between the shaping tank 102 and the shaping surface S, the gap is automatically filled with the material 101 with a uniform thickness for curing the material 101 with the scanning light L. Further, the bottom surface 103 is made of a transparent material to allow the scanning light L to pass through.

In general, in a shaping apparatus having such a suspending type configuration where the scanning light L is emitted from the −Z toward the direction (from lower to upper direction), the material 101, especially, the liquid material 101, is automatically formed with a uniform thickness within the gap, which would provide an advantageous effect in the improvement of the shaping accuracy.

Further, in such a suspending type shaping apparatus, the bottom surface 103 of the shaping tank 102 and the shaped object P are adhered to each other, so that a step of peeling off of the shaped object P from the bottom surface 103 of the shaping tank 102 would be generally required. However, according to the second embodiment, the angular momentum of the rotation stage 10 acts as a shear force between the shaped object P and the bottom surface 103 of the shaping tank 102. Thus, the bottom surface 103 of the shaping tank 102 is separated from the shaped object P by rotation of the rotation stage 10 without requiring a peeling-off step.

Figure 11:
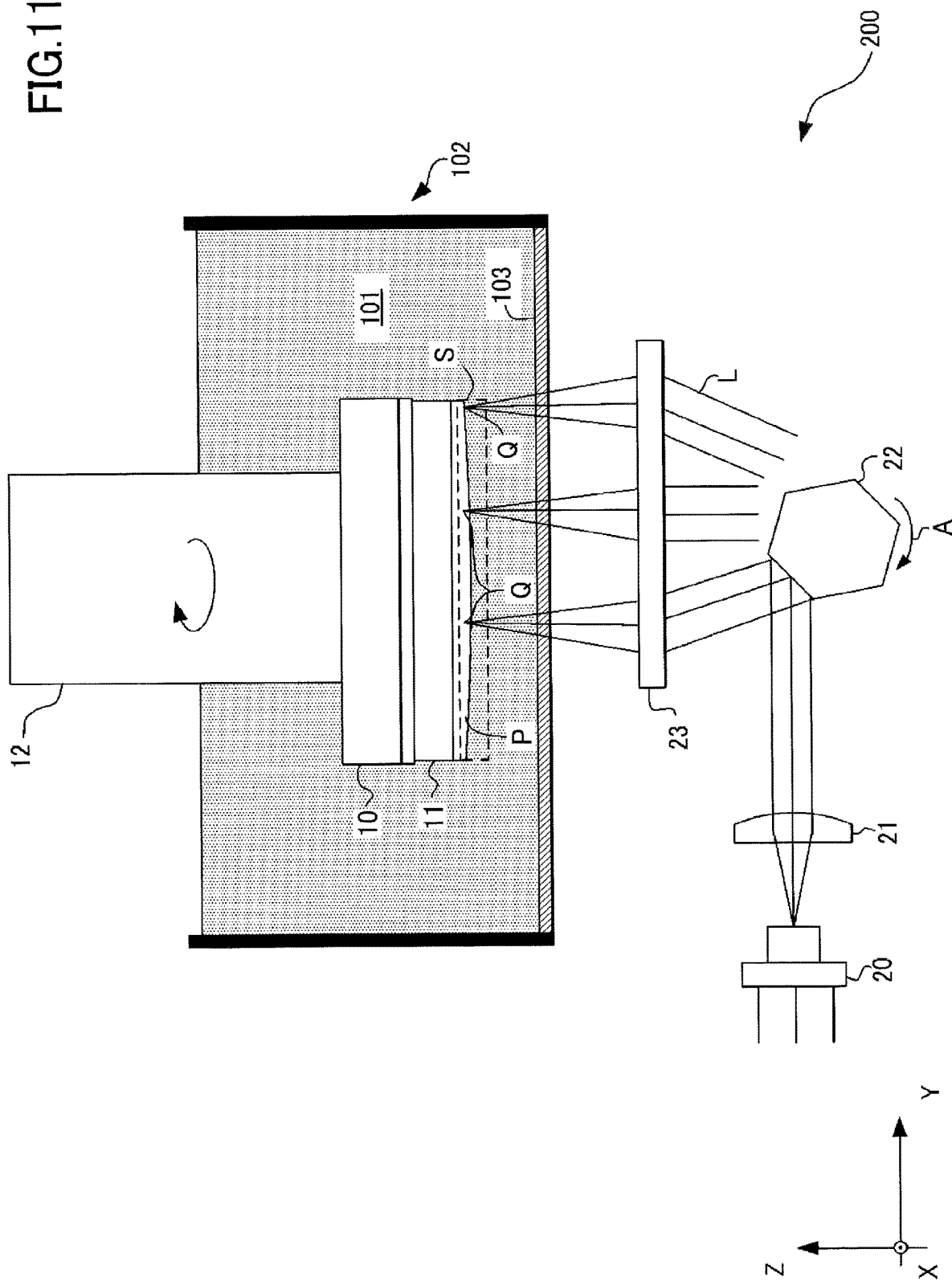
FIG. 11 is a diagram illustrating an example of a configuration of a three-dimensional shaping apparatus according to a third embodiment.

Next, a third embodiment of the present invention will be described. In a typical photofabrication, when the material 101 absorbs scanning light L, energy of light is propagated as heat to the material 101, which changes and cures the material 101. This indicates that it is preferable that a wavelength of light absorbed by the material 101 and a wavelength of the scanning light L be close to each other. In addition, it is also known that the longer the wavelength of light, the longer the transmittance distance of light. However, as illustrated in FIG. 11, it is also possible to use light with a wavelength (i.e., lower energy) longer than the wavelength of light absorbed by the material 101 in photofabrication. Such a method is called multiphoton polymerization, in which light is not usually absorbed by the material 101 because photon energy is usually lower than a band gap of the material 101. However, when optical energy density is high, such as near the focal point, multiphotons may reach a single particle of material 101 and may cause the total energy to exceed the band gap. As a result, the material 101 may simultaneously absorb multiphotons. That is, light is absorbed only near the focal point where the optical energy density is high (i.e., the light is concentrated) and is not absorbed in other regions.

Use of such a phenomenon not only cures the surface of the material 101, but also cures a portion near the focal point located by a predetermined distance inward from the surface of the material 101 (material surface). This enables the scanning light L to pass through the material 101 other than the cured portions, thereby improving the shaping accuracy. In addition, in multiphoton polymerization compared to single photon polymerization, although the shaping resolution is improved, the area of the irradiation positions Q would be reduced, which would result in a decrease in the shaping speed. However, according to the configuration of the present embodiment, while the resolution is improved, the speed of shaping is increased; thus, more suitable shaping of a three-dimensional object may be achieved by the multiphoton polymerization.

Further, since a gap is provided between the shaping surface S and the bottom surface 103 of the shaping tank 102, the shaped object P will not be adhered to the bottom surface of the shaping tank 102. Thus, a peeling-off step is no longer required, thereby increasing the shaping speed of a three-dimensional object.

Figure 12A:
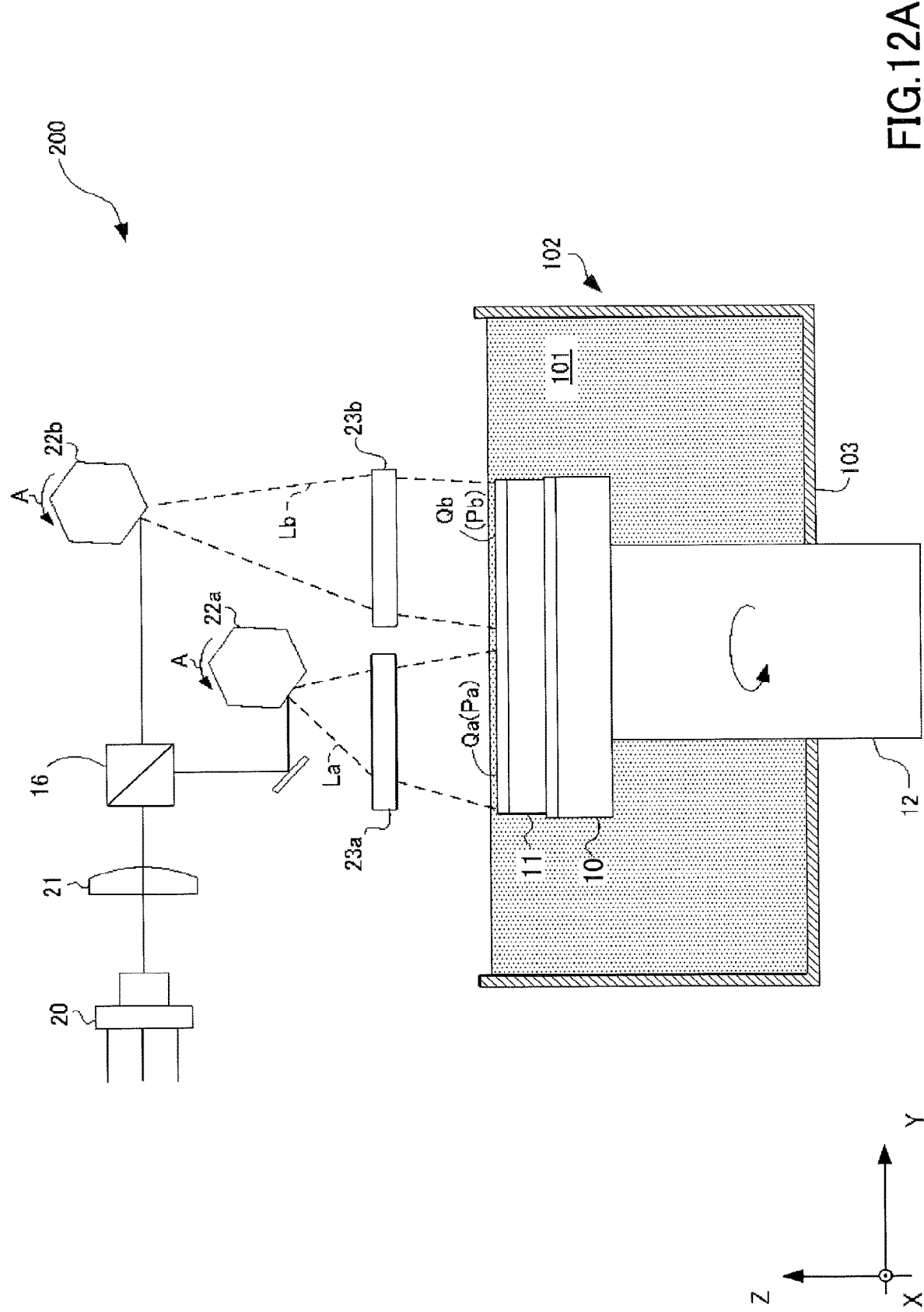
FIGS. 12A and 12B are diagrams each illustrating an example of a configuration of a three-dimensional shaping apparatus according to a fourth embodiment.
Figure 12B:
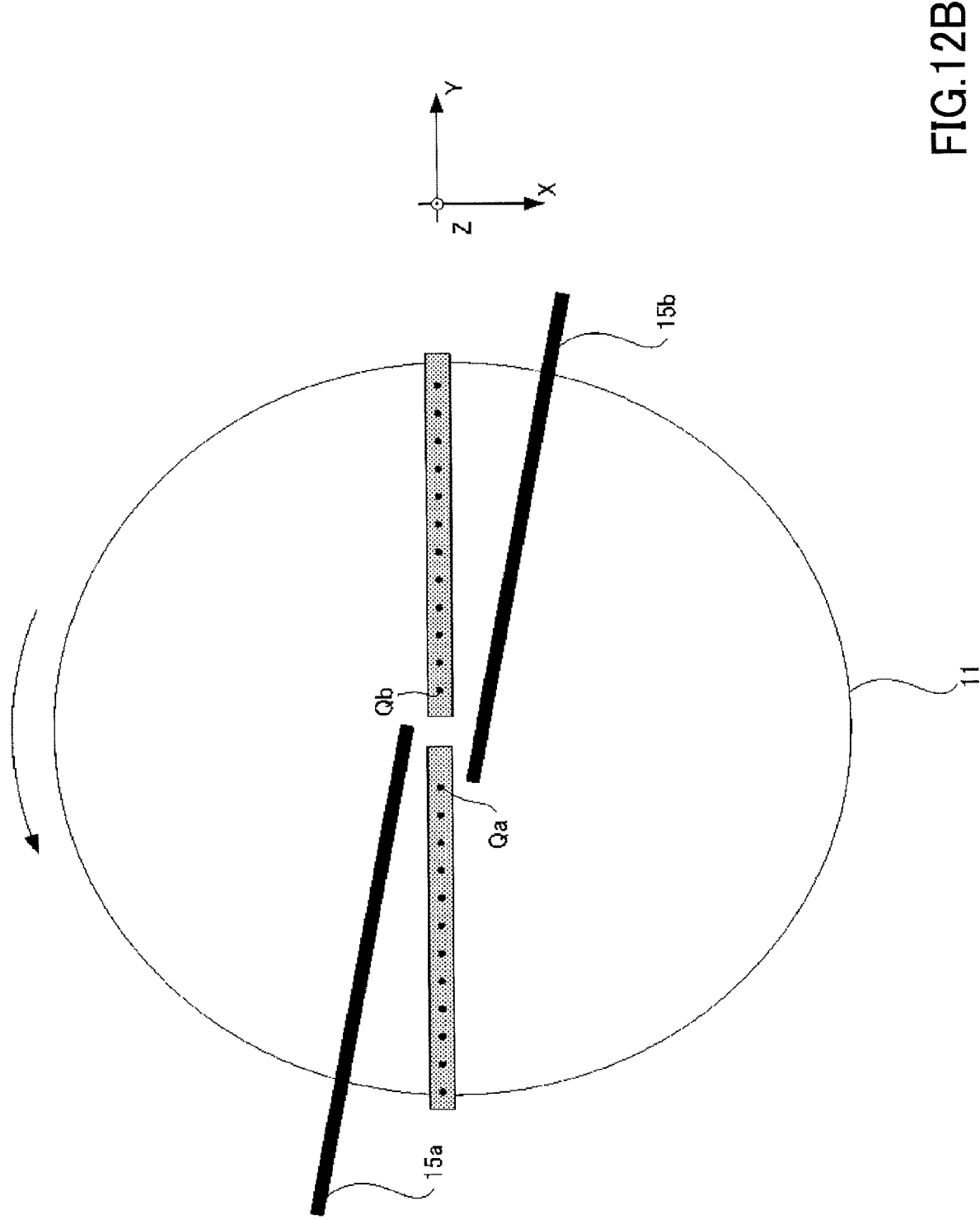

Next, a fourth embodiment of the present invention will be described. FIGS. 12A and 12B illustrate an example of a shaping apparatus 200 having a configuration for emitting two scanning light rays La and Lb to form two identical three-dimensional objects on a shaping surface S.

The shaping apparatus 200 includes an optical emitter 20, two rotation mirrors 22a and 22b, and scanning lenses 23a and 23b. In the shaping apparatus 200, light from the optical emitter 20 is split into two using a half mirror 16 to direct light toward different regions on the shaping surface 5, where first split light is directed to a rotation mirror 22a and a scanning lens 23a, and second split light is directed to a rotation mirror 22b and a scanning lens 23b. That is, in this embodiment, a plurality of scanning light rays La and Lb are applied to different positions on a surface of the material 101. In FIGS. 12A and 12D, irradiation positions Qa are positions to which the scanning light La formed by the rotation mirror 22a and the scanning lens 23a is applied, and irradiation positions Qb are positions to which the scanning light Lb formed by the rotation mirror 22b and the scanning lens 23b is applied. With this configuration, since substantially identical three-dimensional objects Pa and Pb are shaped at a set of the irradiation positions Qa and at a set of the irradiation positions Qb, respectively, throughput may be improved to form the shaped objects Pa and Pb at high speeds. Note that in such a configuration, half of the area of the shaping surface S is formed to correspond to the maximum value of an XY planar projection of the shaped object P. Further, as illustrated in FIG. 12E, when two scanning light rays La and Lb are applied to different points on the shaping surface S, it is more desirable to provide a of surface height adjusting units 15a and 15b at respective positions corresponding to the set of the irradiation positions Qa and the set of the irradiation positions Qb.

Figure 13:
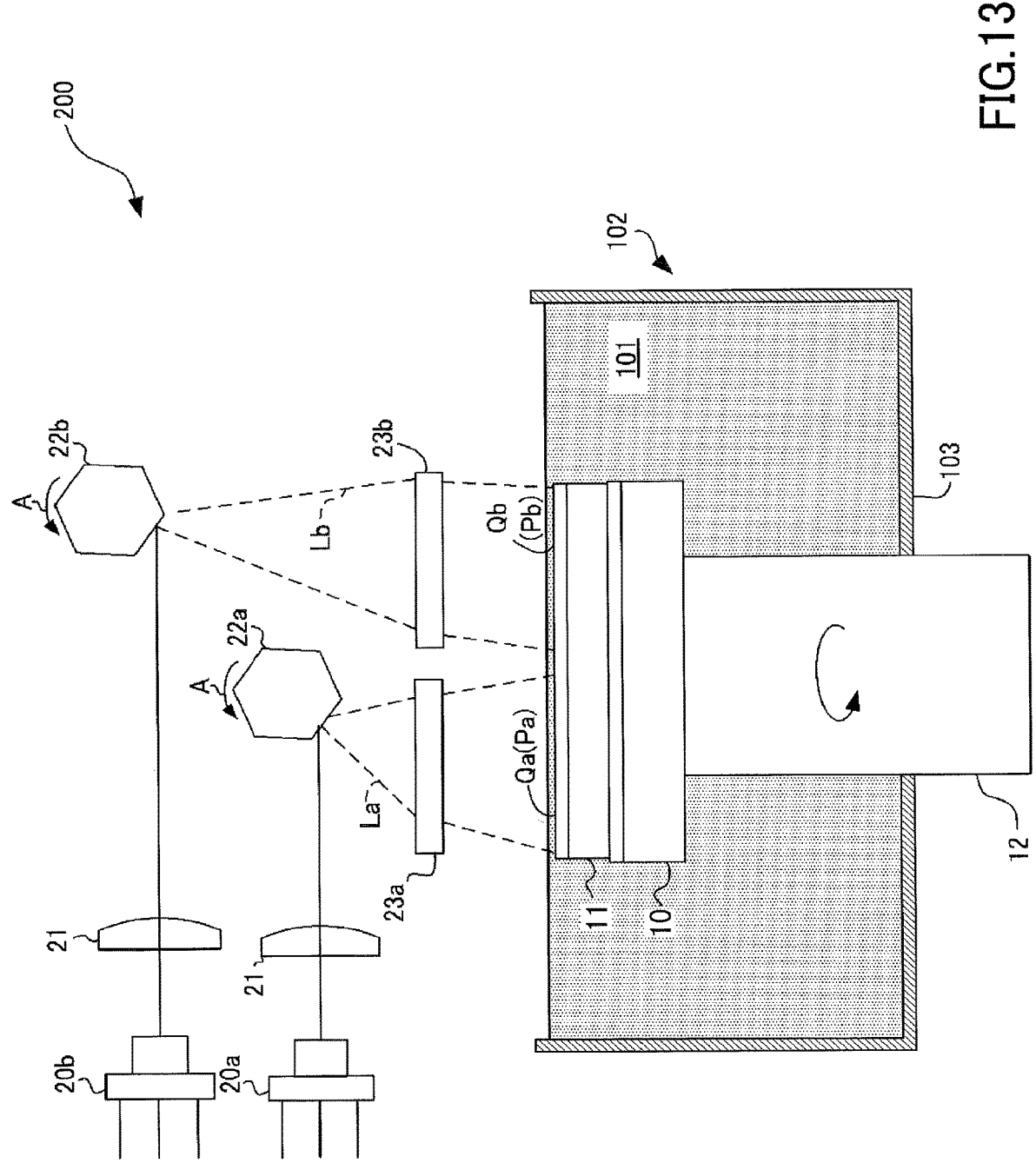
FIG. 13 is a diagram illustrating an example of a configuration of the three-dimensional shaping apparatus illustrated in FIGS. 12A and 12B in which two independent light sources are used.

Alternatively, the shaping apparatus 200 may include optical emitters 20a and 20b, which are independent of each other, as illustrated in FIG. 13. Thus, it the shaping apparatus 200 includes such two independent light sources, it is possible to generate different shaped objects Pa and Pb at respective sets of irradiation positions Qa and Qb. Alternatively, even if a single optical emitter 20 used, the shaping apparatus 200 may include shutters and the like in an optical path between the optical emitter 20 and the rotation mirrors 22a and 22b. In this configuration, the respective shutters and the like may be enabled to control opening/closing time to independently control lighting time with respect to the rotation mirrors 22a and 22b. Further, the scanning lenses 23a and 23b are disposed as separate entities in the present embodiment; however, the scanning lenses 23a and 23b are not necessarily disposed as separate entities. The scanning lenses 23a and 23b may be a single scanning lens 23 configured to separately pass two light rays.

Figure 14:
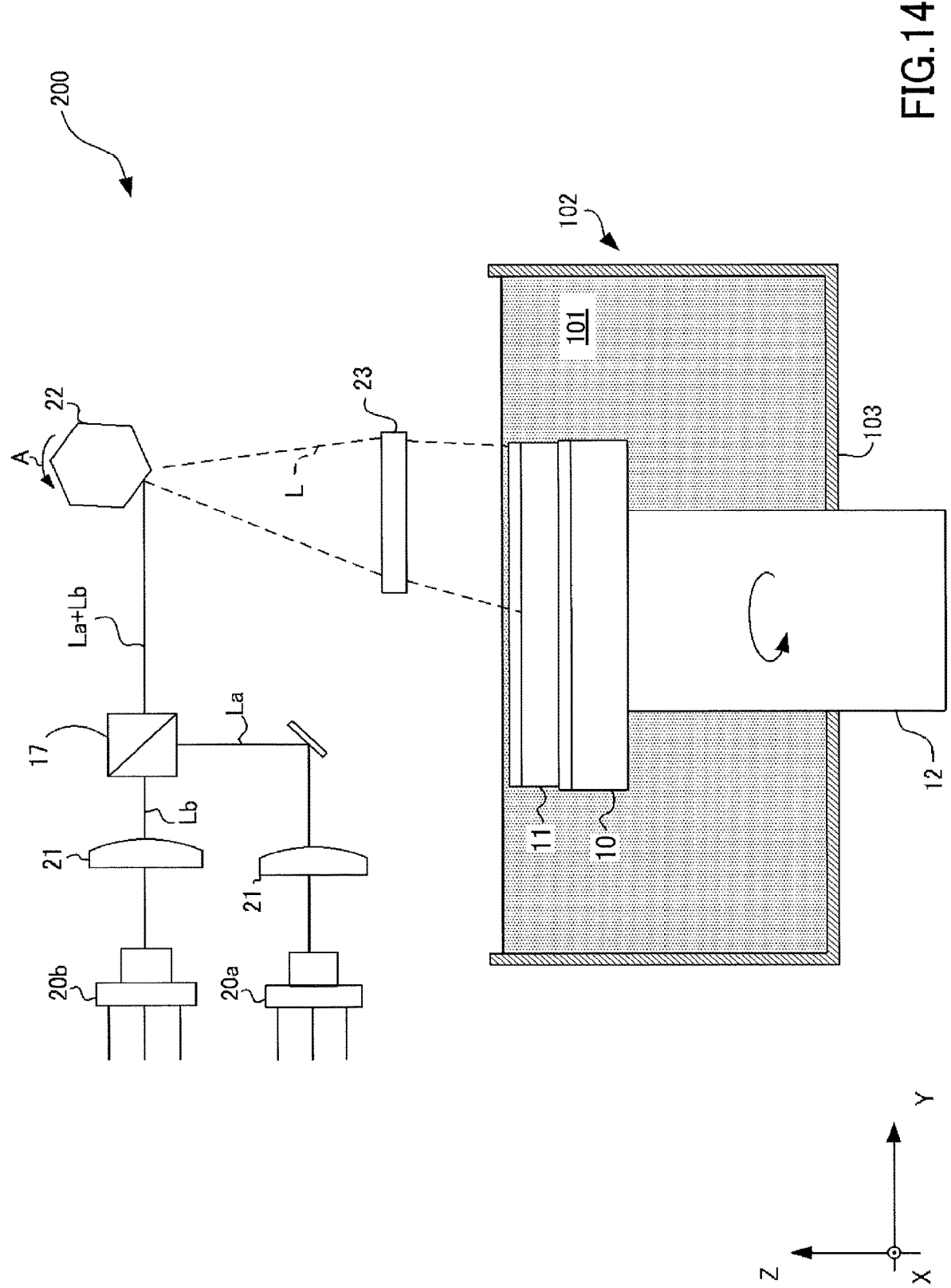
FIG. 14 is a diagram illustrating an example of a configuration of a three-dimensional shaping apparatus according to a fifth embodiment.
Figure 15:
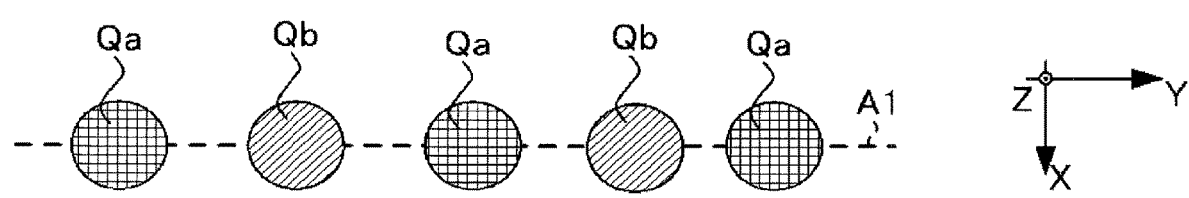
FIG. 15 is a diagram illustrating an example of a path of irradiation light of the three-dimensional shaping apparatus illustrated in FIG. 14.

Next, a fifth embodiment of the present invention will be described. In this embodiment, as illustrated in FIG. 14, the shaping apparatus 200 guides two scanning light rays La and Lb as two beams from the optical emitters 20a and 20b with respect to a single rotation mirror 22 to irradiate an irradiation position by shifting the irradiation timing by one half pixel at a time. In such a configuration, the rotation speed of the rotation mirror 22 may be increased while maintaining the resolution, and the shaped object may thus be formed at a higher speed. In order to superimpose two beams with each other to be guided to the rotation mirror 22, for example, a polarization beam splitter 17 may be used to handle one light ray La as p-polarization and the other light ray Lb as s-polarization. In the case where the p-polarization and s-polarization are used for controlling light rays, for example, the irradiation timings may be shifted by ½ a pixel so that the irradiation positions Qa and the irradiation positions Qb are alternately arranged with ½ pixel intervals, as illustrated in FIG. 15. Thus, more detailed control can be enabled.

Figure 16:
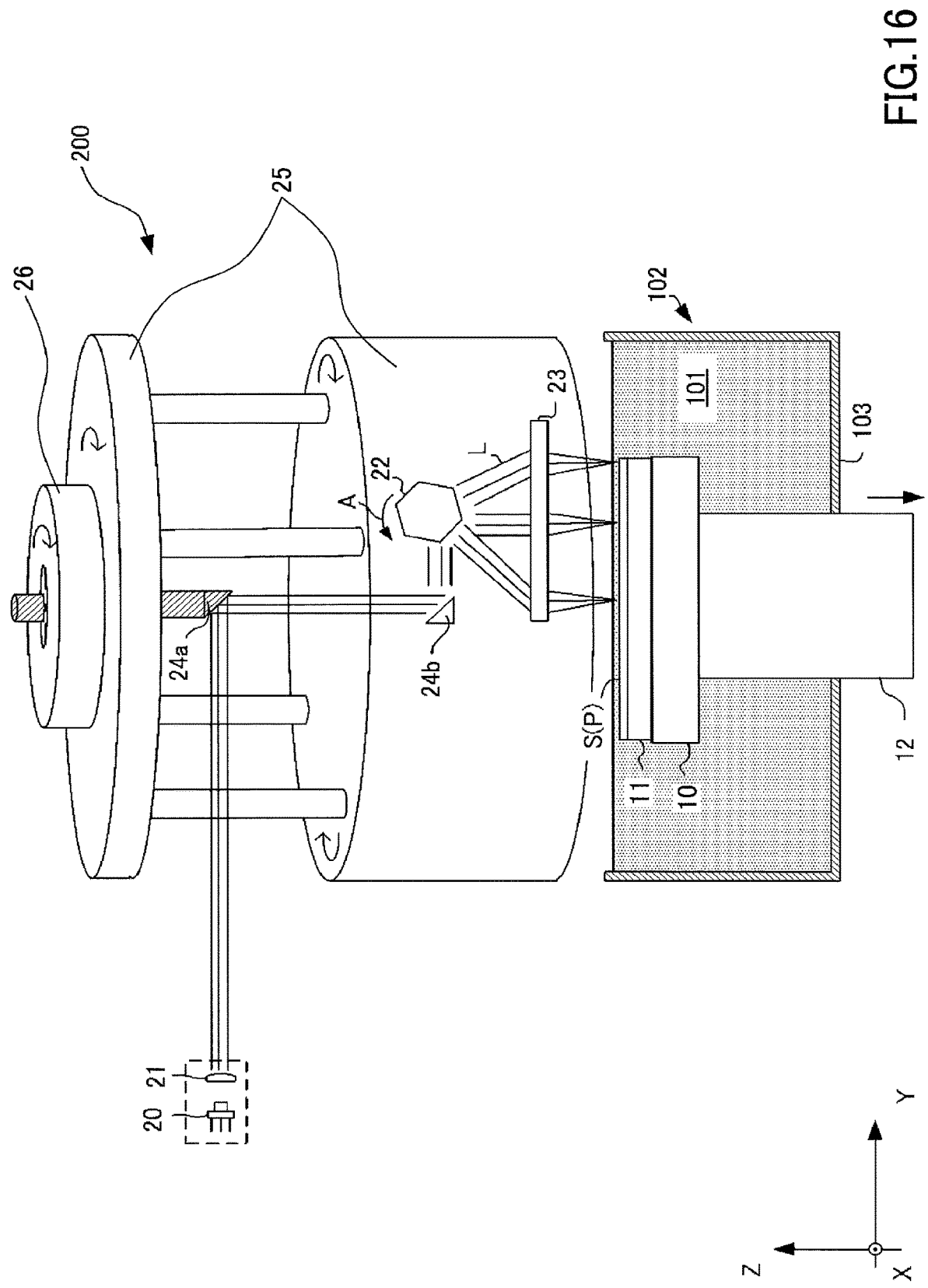
FIG. 16 is a diagram illustrating an example of a configuration of a three-dimensional shaping apparatus according to a sixth embodiment.

Next, a sixth embodiment of the present invention will be described. In this embodiment, the shaping apparatus 200 includes an optical emitter 20 functioning as a light source, a collimator lens 21, an optical scanning module 25 rotatable around a central axis parallel to the Z direction, a mirror 24a and a mirror 24b forming an optical path by reflecting light guided from the optical emitter 20. The shaping apparatus 200 further includes a rotation member 26 attached to the optical scanning module 25, a rotation mirror 22, and a scanning lens 23. Among the above-described elements, description of the same elements as the first to fifth embodiments will be omitted with reference to the same reference numbers. In the shaping apparatus 200, the optical scanning module 25 rotates with respect to a Z axis as the center, instead of the shaping stage 11, as illustrated in FIG. 16. The mirror 24a is fixed at a rotation axis and reflects light toward a mirror 24b, which is also disposed at the rotation axis and is rotated integrally with the optical scanning module 25. That is, in this embodiment, the rotation member 26 and the optical scanning module 25 rotate in accordance with the rotation axis of the shaping surface S so that light guided from the optical emitter 20 is directed via the mirrors 24a and 24b toward the rotation mirror 22. In this case, if the optical emitter 20 is assumed to be non-rotatable, it is preferable that the mirror 24a be non-rotatable, and that the mirror 24b, the rotation mirror 22, and the lens 23 fixed to the optical scanning module 25 be integrally rotatable. Further, in this embodiment, the rotation stage 10 and the shaping stage 11 are not rotatable, and are supported by the Z stage 12, which is configured to move upward or downward in the Z direction. Accordingly, in this embodiment, the rotation member 26 and the optical scanning module 25 correspond to a "member including at least a rotation mirror 22". This rotation member 26 rotates the optical scanning module 25 with respect to the Z axis as a rotation axis, so as to function as a rotation mechanism configured to rotate at least one of the optical scanning unit and the shaping surface relative to each other with respect to the Z axis as a rotation axis.

Use of the sixth embodiment makes it possible to increase the shaping speed, even when the material 101 to be shaped is a liquid material. This feature is described below in detail. In the configurations in the first to fifth embodiments, the shaping surface S is supposed to rotate, as already described above. In such a case, if the material 101 used is a liquid material, rotations of the shaping stage 11 may cause inertial effects in the liquid material 101 such that the shaped object P may flow in an opposite direction to the rotation direction of the shaping stage 11. For example, it is known in the art that when photocuring a liquid material, such as an ultraviolet curable resin, the curing time required for photocuring a liquid material is in the order of milliseconds. When the rotation speed of the rotation mirror 22 is assumed to be a typical rotation speed of 1,000 to 10,000 rpm disclosed in the literature, rendering intervals of a straight line rendered by this method with respect to a rotation direction of the rotation mirror 22 would be 5 to 50 ms, which is on the order of the photocuring time. Accordingly, in the configurations of the first to fifth embodiments, where the rotation stage 10 and the shaping stage 11 are rotated together with the material 101, the material 101 may flow and potentially not form a desired shape in shaping of photo-curable resin.

In this respect, in the method and the configuration used in the sixth embodiment, such an inertial force does not act on the liquid material 101 subject to shaping. Thus, even when the shaping is performed at high speeds, stable shaping will be provided without degrading the accuracy of shaping.

In the sixth embodiment, as a mechanism for rotating the optical scanning module 25, a method of connecting the optical scanning module 25 to a large motor, or a method of performing internally driven rotation of the optical scanning module 25 at any one of surfaces in contact with the optical scanning module 25 may be considered.

As the method of connecting the optical scanning module 25 to a large motor, for example, the rotation member 26 in FIG. 16 may be connected to a motor to rotate the rotation member 26 coaxially with a rotation axis of the shaping stage 11, thereby rotating the optical scanning module 25.

Figure 17:
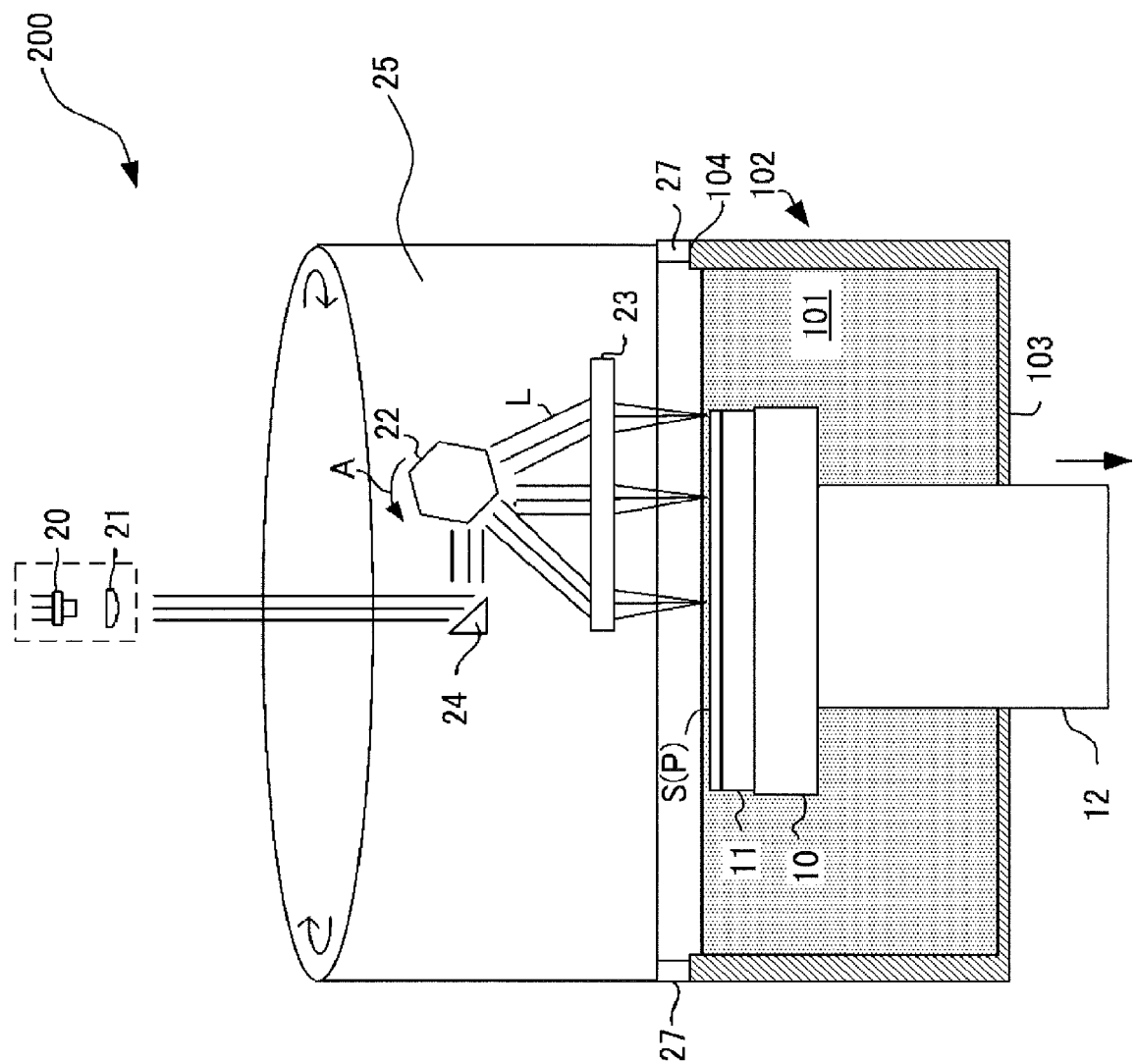
FIG. 17 is a diagram illustrating an example of a configuration of a three-dimensional shaping apparatus according to a seventh embodiment.

The internally driven rotation method, for example, is illustrated in FIG. 17 as a conceptual diagram according to a seventh embodiment.

A shaping apparatus 200 according to the seventh embodiment includes an optical emitter 20 functioning as a light source, a collimator lens 21, an optical scanning module 25 rotatable around a central axis parallel to the Z direction, and a mirror 24 configured to reflect light guided from the optical emitter 20 to form an optical path. The shaping apparatus 200 further includes a rotation mirror 22, a scanning lens 23, a shaping tank housing 104, and a rotation drive unit 27 disposed between the shaping tank housing 104 and the optical scanning module 25. In the above-described elements, the same elements as the first to fifth embodiments will be omitted with reference to the same reference numbers. In the shaping apparatus 200, light guided from the optical emitter 20 is reflected by the mirror 24 and the reflected light is guided to the rotation mirror 22. The optical scanning module 25 is coupled to a rotation drive unit 27, and the rotation drive unit 27 is driven along the shaping tank housing 104 to rotate the optical scanning module 25. Such a rotation drive unit 27 may be rotated by a rotation drive force such as a roller or a rotary device, or the rotation drive unit 27 may be rotated by a rotation drive force from a separate drive unit using a belt or the like. As described above, in this embodiment, the rotation drive unit 27 rotates the optical scanning module 25 including the rotation mirror 22 with respect to the Z axis as a rotation axis to function as a "rotation mechanism that rotates at least one of the optical scanning unit and the shaping surface relative to each other with respect to the Z axis as a rotation axis". Further, in this embodiment, a step of operating the rotation drive unit 27 to rotate the optical scanning module 25 relative to the shaping surface S corresponds to the rotation step.

According to the shaping apparatus of the above-described embodiments, the shaping accuracy and shaping speed for shaping a three-dimensional object will be simultaneously improved.

Although the preferred embodiments have been described in detail, preferred embodiments are not limited to the above-described embodiments, and various modifications and substitutions may be made to the above-described embodiments without departing from the scope set forth in the claims. For example, respective configurations illustrated as the first to seventh embodiments may be used in combination.

The present invention is not limited to the specifically disclosed embodiments, and variations and modifications may be made without departing from the scope of the present invention.

What is claimed is:

1. A three-dimensional object shaping apparatus for forming an object with a desired shape by application of light onto a shaping surface or a material disposed on an already shaped layer on the shaping surface in a three-dimensional space, the three-dimensional space being represented by a three-dimensional orthogonal XYZ coordinate system, and the three-dimensional object shaping apparatus comprising:
   a light source configured to emit light;
   a driver to move the shaping surface or the material, which are parallel to an XY plane of the XYZ coordinate system, in a Z axis direction of the XYZ coordinate system;
   a polygon mirror configured to scan light emitted from the light source along a Y axis direction of the XYZ coordinate system, wherein the Y axis direction is perpendicular to the Z axis, and wherein the polygon mirror rotates about an X axis of the XYZ coordinate system; and
   a rotator to perform rotation selectable from one or both of the polygon mirror and the shaping surface relative to each other about the Z axis as a rotation axis, wherein a pattern of the light to be applied to the shaping surface or the material is controlled by a combination of a rotation by the rotator and the scanning of the light performed by the polygon mirror, and wherein the scanned light travels radially from the rotation axis by scanning the light along a radial direction defined in the XY plane.

2. The three-dimensional object shaping apparatus according to claim 1, wherein the rotator or another rotator rotates the shaping surface or the material with respect to the Z axis as a rotation axis.

3. The three-dimensional object shaping apparatus according to claim 1, wherein the rotator rotates a member including at least the optical scanner with respect to the Z axis as a rotation axis.

4. The three-dimensional object shaping apparatus according to claim 1, wherein the rotator rotates each of the shaping surface or the material and a member including at least the optical scanner, with respect to the Z axis as a rotation axis.

5. The three-dimensional object shaping apparatus according to claim 1, wherein the polygon mirror is a rotating polygon mirror.

6. The three-dimensional object shaping apparatus according to claim 1, further comprising:
   a surface height adjuster for maintaining a surface of the material at a constant height.

7. The three-dimensional object shaping apparatus according to claim 1, wherein the light is applied in a vertically upward direction.

8. The three-dimensional object shaping apparatus according to claim 1, further comprising:
   an optical condenser for condensing the light emitted from the light source, wherein a focal surface of the optical condenser is set inward from a surface of the material.

9. The three-dimensional object shaping apparatus according to claim 1, wherein a plurality of light rays of the light is applied onto a surface of the material.

10. The three-dimensional object shaping apparatus according to claim 1, wherein the driver moves at a constant speed.

11. The three-dimensional object shaping apparatus according to claim 1, further comprising an additional polygon mirror.

12. The three-dimensional object shaping apparatus according to claim 1, wherein at least one of an irradiation time and a lighting interval of the light from the light source varies depending on a position of the scanned light from the rotation axis.

13. The three-dimensional object shaping apparatus according to claim 1, wherein the Z axis direction movement by the driver, a relative rotation of the at least one of the polygon mirror and the shaping surface by the rotator, and the scanning of light are performed simultaneously.

14. A three-dimensional object shaping method using the three-dimensional object shaping apparatus according to claim 1 for forming an object with a desired shape by application of light onto a shaping surface or a material disposed on an already shaped layer in a three-dimensional space, the three-dimensional space being represented by a three-dimensional orthogonal XYZ coordinate system, and the three-dimensional object shaping method comprising:

scanning, by the polygon mirror, light on the shaping surface or the material along the Y axis direction;

rotating the polygon mirror about the X axis of the XYZ coordinate system;

rotating, by the rotator, at least one of the polygon mirror and the shaping surface relative to each other about the Z axis as a rotation axis; and moving, by the driver, the shaping surface or the material in the Z axis direction, wherein a pattern of the light being applied to the shaping surface or the material is controlled by a combination of the rotating and the scanning of the light, and wherein the scanned light travels radially from the rotation axis by scanning the light along the radial direction.

* * * * *